US012666077B2

(12) United States Patent
Doyen et al.

(10) Patent No.: US 12,666,077 B2
(45) Date of Patent: Jun. 23, 2026

(54) METHODS AND APPARATUSES FOR ENCODING/DECODING A VOLUMETRIC VIDEO, METHODS AND APPARATUS FOR RECONSTRUCTING A COMPUTER GENERATED HOLOGRAM

(71) Applicant: InterDigital CE Patent Holdings, SAS, Paris (FR)

(72) Inventors: Didier Doyen, Cesson-Sevigne (FR); Valter Drazic, Betton (FR); Vincent Brac De La Perriere, Rennes (FR); Guillaume Boisson, Pleumeleuc (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 76 days.

(21) Appl. No.: 18/289,464

(22) PCT Filed: May 2, 2022

(86) PCT No.: PCT/EP2022/061660
§ 371 (c)(1),
(2) Date: Nov. 3, 2023

(87) PCT Pub. No.: WO2022/233763
PCT Pub. Date: Nov. 10, 2022

(65) Prior Publication Data
US 2024/0244259 A1      Jul. 18, 2024

(30) Foreign Application Priority Data

May 6, 2021     (EP) ..................................... 21305588

(51) Int. Cl.
*H04N 19/597*         (2014.01)
*G03H 1/08*           (2006.01)
(Continued)

(52) U.S. Cl.
CPC ............. *H04N 19/597* (2014.11); *G03H 1/08* (2013.01); *H04N 13/388* (2018.05); *H04N 19/176* (2014.11); *H04N 2013/0081* (2013.01)

(58) Field of Classification Search
None
See application file for complete search history.

(56) References Cited

U.S. PATENT DOCUMENTS 6,335,765 B1     1/2002   Daly
8,717,405 B2     5/2014   Li
(Continued)

FOREIGN PATENT DOCUMENTS

GB          2449631 A       12/2008
GB          2452765 A        3/2009
WO       2009109804 A1       9/2009

OTHER PUBLICATIONS

Petrovic, G., et al. "Framework for Layered 3D Video Streaming" Proc. of 27th Symposium on Information Theory in the Benelux, 08-09-06-2006, Noordwijk, The Netherlands 2006 (8 pages).
(Continued)

*Primary Examiner* — Christopher Braniff
(74) *Attorney, Agent, or Firm* — Condo Roccia Koptiw LLP

(57)          ABSTRACT

Methods and apparatuses for encoding/decoding data content representative of a volumetric video are provided, wherein, the encoding/decoding comprises encoding in/decoding from a bitstream, an indicator specifying whether data content has information representative of at least one set of depth layers, the information representative of a set of depth layers specifying a number of depth layers and a depth value for each of the depth layers for a layer-based representation of the volumetric video. Methods and apparatuses for reconstructing Computer Generated Holograms from a
(Continued)

reconstructed layered-based representation of the volumetric video are also provided.

19 Claims, 12 Drawing Sheets

(51) Int. Cl.

| | | |
|---|---|---|
| *H04N 13/00* | (2018.01) | |
| *H04N 13/388* | (2018.01) | |
| *H04N 19/176* | (2014.01) | |

(56) References Cited

U.S. PATENT DOCUMENTS

| | | | | |
|---|---|---|---|---|
| 9,020,241 | B2 | 4/2015 | Leichsenring | |
| 9,100,642 | B2 | 8/2015 | Ha | |
| 11,184,599 | B2 | 11/2021 | Harviainen | |
| 2005/0286759 | A1 | 12/2005 | Zitnick, III | |
| 2010/0202540 | A1 | 8/2010 | Fang | |
| 2012/0127284 | A1 | 5/2012 | Bar-Zeev | |
| 2013/0069932 | A1 | 3/2013 | Ha | |
| 2013/0071012 | A1 | 3/2013 | Leichsenring | |
| 2016/0307372 | A1 | 10/2016 | Pitts | |
| 2016/0352791 | A1 | 12/2016 | Adams | |
| 2020/0219290 | A1* | 7/2020 | Tourapis | H04N 19/597 |
| 2020/0294271 | A1* | 9/2020 | Lola | G06T 17/20 |
| 2022/0159298 | A1* | 5/2022 | Boyce | H04N 19/124 |
| 2022/0191498 | A1* | 6/2022 | Schwarz | H04N 19/156 |
| 2022/0292763 | A1* | 9/2022 | Ilola | G06T 15/04 |

OTHER PUBLICATIONS

Shum, Heung-Yeung, et al. "Rendering with concentric mosaics." In Proceedings of the 26th annual conference on Computer graphics and interactive techniques, 1999 (8 pages).

Tao, Michael W., et al. "Depth from combining defocus and correspondence using light-field cameras", In: Proceedings of the IEEE International Conference on Computer Vision. 2013. p. 673-680 (8 pages).

Lloyd, Stuart P., "Least Square Quantization in PCM", Institute of Electrical and Electronics Engineers (IEEE), IEEE Transactions on Information Theory, vol. 28, Issue 2, Mar. 1982, 9 pages.

"Iso/Iec Fdis 23090-5 Visual Volumetric Video-based Coding and Video-based Point Cloud Compression", International Organization for Standardization, ISO/IEC JTC 1/SC 29/WG11, Document: N19579, Sep. 21, 2020, 353 pages.

"Infrastructure of audiovisual services—Coding of moving video—Advanced video coding for generic audiovisual services", International Telecommunication Union, Telecommunication Standardization Sector of ITU, Series H: Audiovisual and Multimedia Systems, Recommendation ITU-T H.264, Feb. 2014, 790 pages.

Fleureau et al., "MIV CE1-Related—Activation of Transparency Attribute and MPI Profile in MIV", International Organization for Standardization (ISO), Coding of Moving Pictures and Audio, ISO/IEC JTC 1/SC 29/WG 4, Document: m55089, Online presentation, Oct. 2020, 14 pages.

Penner et al., "Soft 3D reconstruction for view synthesis", Association for Computing Machinery (ACM), ACM Transactions on Graphics, vol. 36, Issue 6, Article No. 235, Dec. 2017, 11 pages.

Gilles et al., "Real-time layer-based computer-generated hologram calculation for the Fourier transform optical system", Applied Optics, vol. 57, Issue No. 29, Oct. 10, 2018, 10 pages.

"Information Technology—Digital Compression and Coding of Continuous-Tone Still Images—Requirements and Guidelines, Technical Corrigendum 1: Patent Information Update", International Telecommunication Union, Telecommunication Standardization Sector of ITU, Recommendation T.81, Corrigendum 1, Jan. 2004, 12 pages.

Dore et al., "Activation of Transparency Attribute and MPI Profile in MIV", International Organization for Standardization (ISO), ISO/IEC JTC 1/SC 29/WG 4, MPEG M55173, MPEG133, Online Meeting, Jan. 2021, 5 pages.

Vandame et al., "Pipeline for Real-Time Video View Synthesis", Institute of Electrical and Electronics Engineers (IEEE), 2020 IEEE International Conference on Multimedia & Expo Workshops (ICMEW), Jul. 6, 2020, London, United Kingdom, 6 pages.

"Infrastructure of audiovisual services—Coding of moving video—Reference software for ITU-T H.265 high efficiency video coding", International Telecommunication Union, Telecommunication Standardization Sector of ITU, Series H: Audiovisual and Multimedia Systems, Recommendation ITU-T H.265.2, Oct. 2014, 12 pages.

"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.

"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.

"Information technology—Coded Representation of Immersive Media—Part 5: Visual Volumetric Video-Based Coding (V3C) and Video-based Point Cloud Compression (V-PCC)", International Organization for Standardization and the International Electrotechnical Commission (ISO/IEC), ISO/IEC JTC 1/SC 29/WG 07, ISO/IEC 23090-5:2021, Jun. 2021, 370 pages.

"Information technology—Coded Representation of Immersive Media—Part 12: Immersive Video, DIS Stage", International Organization for Standardization and the International Electrotechnical Commission (ISO/IEC), ISO/IEC JTC 1/SC 29/WG 04, ISO/IEC 23090-12:2021(E), Jan. 2021, 80 pages.

"Infrastructure of audiovisual services—Coding of moving video—High Efficiency Video Coding", International Telecommunication Union, Telecommunication Standardization Sector of ITU, Series H: Audiovisual and Multimedia Systems, Recommendation ITU-T H.265, Dec. 2016, 664 pages.

MacQueen, J., "Some Methods for Classification and Analysis of Multivariate Observations", University of California, Press, Proceedings of Fifth Berkeley Symposium on Mathematical Statistics and Probability, vol. 1: Statistics, Jan. 1967, 17 pages.

"Committee Draft of MPEG Immersive Video", International Organization for Standardization, ISO/IEC JTC 1/SC 29/WG 11, N19482, Jul. 3, 2020, 82 pages.

\* cited by examiner

1200

140

METHODS AND APPARATUSES FOR ENCODING/DECODING A VOLUMETRIC VIDEO, METHODS AND APPARATUS FOR RECONSTRUCTING A COMPUTER GENERATED HOLOGRAM

CROSS REFERENCE TO RELATED APPLICATIONS

This application is a U.S. National Stage Application under 35 U.S.C. § 371 of International Patent Application No. PCT/EP2022/061660, filed May 2, 2022, which is incorporated herein by reference in its entirety.

This application claims priority to European Application No. 21305588.2, filed May 6, 2021, which is incorporated herein by reference in its entirety.

TECHNICAL FIELD

The present embodiments generally relate the domain of three-dimensional (3D) scene and volumetric video content, including holographic representation. The present document is also understood in the context of the encoding, the formatting and the decoding of data representative of the texture and the geometry of a 3D scene for a rendering of volumetric content on end-user devices such as mobile devices or Head-Mounted Displays (HMD). The present embodiments generally relate to methods and apparatuses for encoding and decoding volumetric video representative of a 3D scene. At least one of the present embodiments further relates to a method or an apparatus for generating a Computer Generated Hologram based on a layer-based representation of a volumetric video.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently, the original concept of holography evolved into the modern concept of Computer Generated Holography (CGH). The requirements of high stability and photosensitive material made holography impractical for the display of dynamic 3D content. With the emergence of liquid crystal displays, the possibility of modulating the phase of an incoming wave front, and thus of shaping it at will, made it possible to recreate interference patterns on dynamic devices. The principle of CGH is to reconstruct the exact same light wave front emitted by a 3D object within a 3D scene. This wave front carries all the information on parallax and distance. There are several ways to calculate a CGH depending on the representation format of the 3D scene it is considering. However, the generating of the CGH from an immersive video content requires intensive computational resources. It is desirable to improve the generating of CGH to achieve a better trade-off between requirement of real-time computation and quality of the CGH in a scheme of distribution of immersive video content.

Different approaches may already be used to represent immersive video content among which multiplane images and Point Cloud.

A multiplane image (MPI) is a layered representation of a volumetric scene where each layer is actually a slice of the 3D space of the scene. Each slice is sampled according to an underlying central projection (e.g. perspective, spherical, . . . ) and a sampling law which defines the interlayer spacing. A layer comprises texture (i.e. color information) as well as transparency information of any 3D intersecting object of the scene. From this sliced representation, it is possible to recover/synthesize any viewpoint located in a limited region around the center of the underlying projection. It can be performed making use of efficient algorithms (e.g. "reversed" Painter's algorithm) which blends each layer with the proper weights (i.e. transparency) starting from the nearest to the furthest layer. Such techniques may run very much faster than other known view synthesis processes.

Different approaches, like the MIV standard (ISO/IEC CD 23090-12, Information technology—Coded Representation of Immersive Media—Part 12: MPEG Immersive Video, N19482, 4 Jul. 2020) may already be used to transport immersive video content represented in a MPI format without any syntax modification. Only the transparency attribute, for instance, provisioned in the V3C (ISO/IEC FDIS 23090-5, Information technology—Coded Representation of Immersive Media—Part 5: Visual Volumetric Video-based Coding (V3C) and Video-based Point Cloud Compression (V-PCC), N19579, 4 Jul. 2020) mother specification of MIV, has to be activated. The MPI may be conveyed as two video bitstreams respectively encoding texture and transparency patch atlas images. The depth (i.e. the geometry data corresponding to a distance between projected points of the 3D scene and the projection surface or projection center) of each patch is constant (because of the principles of MPI encoding) and may be signaled, for example, in an atlas information data stream and/or in metadata of one of the data streams or in metadata of one data stream encoding the two sequences of atlases in different tracks.

A point cloud is a set of points with different attributes including texture information (RGB) and position information (XYZ). The V3C (ISO/IEC FDIS 23090-5, Information technology—Coded Representation of Immersive Media—Part 5: Visual Volumetric Video-based Coding (V3C) and Video-based Point Cloud Compression (V-PCC), N19579, 4 Jul. 2020) specification provides a method to transport immersive video content represented in a Point cloud format.

It might be useful to describe new metadata in order to efficiently reconstruct the volumetric video for instance used in the reconstruction of a CGH.

SUMMARY

According to an aspect, a method for decoding is disclosed. The decoding method comprises decoding, from a bitstream, data content representative of a volumetric video; and decoding, from a bitstream, an indicator specifying whether data content has information representative of at least one set of depth layers, the information representative of a set of depth layers specifying a number of depth layers and a depth value for each of the depth layers for a layer-based representation of the volumetric video. The decoding method further comprises decoding responsively to the indicator, from the bitstream, an information representative of the at least one set of depth layers.

According to another aspect, an apparatus for decoding comprises one or more processors configured to implement the method for decoding according to any one of the embodiments disclosed herein.

According to another aspect, a method for encoding is disclosed. The encoding method comprises encoding, in a bitstream, data content representative of a volumetric video; and encoding, in a bitstream, an indicator specifying whether data content has information representative of at least one set of depth layers, the information representative of a set of depth layers specifying a number of depth layers and a depth value for each of the depth layers for a layer-based representation of the volumetric video. The encoding method further comprises decoding responsively to the indicator, in the bitstream, an information representative of the at least one set of depth layers.

According to another aspect, an apparatus for encoding comprises one or more processors configured to implement the method for encoding according to any one of the embodiments disclosed herein.

According to another aspect, a method for reconstructing at least one Computer Generated Hologram from a layered-based representation of the volumetric content is provided.

According to another aspect, an apparatus for reconstructing at least one Computer Generated Hologram from layered based representation of the volumetric content is provided, wherein the apparatus comprising one or more processors configured for reconstructing at least one Computer Generated Hologram from a layered based representation of the volumetric content according to any one of the embodiments disclosed herein.

Advantageously, an information representative of a set of depth layers specifying a number of depth layers and a depth value for each of the depth layers for a layer-based representation of the volumetric video can help an adaptation of the processor to its capabilities by reducing the number of layers while maintaining a good Computer Generated Hologram quality.

One or more embodiments also provide a computer program comprising instructions which when executed by one or more processors cause the one or more processors to perform any one of the methods according to any of the embodiments described above. One or more of the present embodiments also provide a computer readable storage medium having stored thereon instructions for encoding or decoding volumetric content, or reconstructing Computer Generated Holograms according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

The present disclosure will be better understood, and other specific features and advantages will emerge upon reading the following description, the description making reference to the annexed drawings wherein.

DETAILED DESCRIPTION

Figure 1:
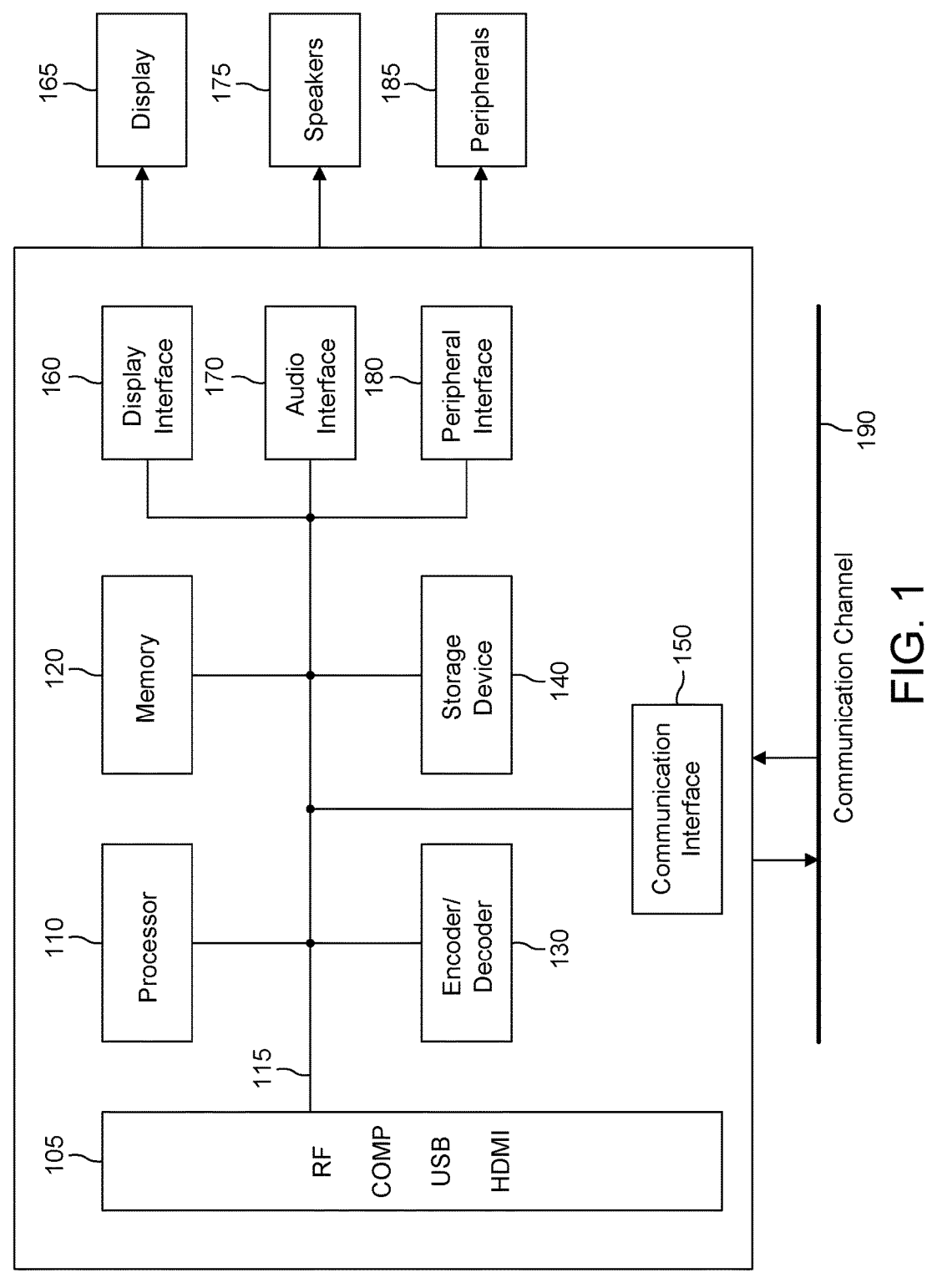
FIG. 1 shows an example architecture of a device which may be configured to implement a method described in relation with any one of FIG. 6, 12, 14 16 according to a non-limiting embodiment of the present principles.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120

(e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video/3D scene or decoded video/3D scene, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video/3D scene, the decoded video/3D scene or portions of the decoded video/3D scene, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 100 may be provided through various input devices as indicated in block 105. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 may provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television.

In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, and processors based on a multi-core architecture, as non-limiting examples.

The principle of CGH is to reconstruct the exact same light wave front emitted by a 3-dimensional object. This wave front carries all the information on parallax and distance. Both information is lost by 2-dimensional conventional imaging systems (digital cameras, 2D images, 2D displays . . . ), and only parallax can be retrieved displaying recent volumetric contents on lightfield displays. The impossibility of such displays to correctly render depth cues leads to visual conflicts, which can cause eye strain, headache, nausea and lack of realism.

Holography is historically based on the recording of the interferences created by a reference beam, coming from a coherent light source, and an object beam, formed by the reflection of the reference beam on the subject. The interference pattern was by the time recorded in photosensitive material, and locally (microscopically) looks like a diffraction grating, with a grating pitch of the order of the wavelength used for the recording. Once this interference pattern recorded, its illumination by the original reference wave re-creates the object beam, and the original wave front of the 3D object.

The original concept of holography evolved into the modern concept of CGH. The requirements of high stability and photosensitive material made holography impractical for the display of dynamic 3D content. With the emergence of liquid crystal displays, the possibility of modulating the phase of an incoming wave front, and thus of shaping it at will, made it possible to recreate interference patterns on dynamic devices. The hologram can this time be computed and referred to under the denomination Computer Generated Hologram (CGH). The synthesis of CGH requires the computation of the interference pattern that was previously recorded, which can be done through various methods using Fourier optics. The object beam (i.e. the 3D image) will be obtained by illuminating an LCOS SLM display, bearing the CGH, with the reference beam.

One major aspect of CGH synthesis is thus evaluating the wave front emitted by a 3D object or scene toward a (hologram) plane. CGH can be synthesized from any form of 3D content, using different approaches. For example, one approach is based on Layered 3D scenes. Another approach is based on Point Clouds.

A three-dimensional scene can be described as a superposition of layers, considered as slices of the 3D scene. From this paradigm, the scene is described as a superposition of layers, to each of which is associated a depth in the scene. This description of a 3D scene is very well adapted to Fourier Transform models of diffraction. This is especially the case for the model of angular spectrum. The layer approach to compute CGHs has the advantage of low complexity and high computation speed due to the use of Fast Fourier Transform algorithms (FFT) embedded inside a Propagation Transform (PT), enabling the processing of a single layer at high speed. Some techniques were also designed to take care of occlusions, through the implementation of masks in active pixels, or ping-pong algorithms. One approach is to simulate propagation of light through the scene starting at the furthest layer, e.g., at a background layer. The light propagation is then computed from the furthest layer to the hologram plane, by layer-to-layer propagation transform. In detail, the light emitted by layer N received by the next layer plane N+1 is computed, and the contribution of this layer N+1 (meaning the light emitted by N+1) is added to the result. The light emitted by the layer N+1 is multiplied by the layer mask. The light emitted by layer N+1 is equal to the sum of both contributions.

Figure 2:
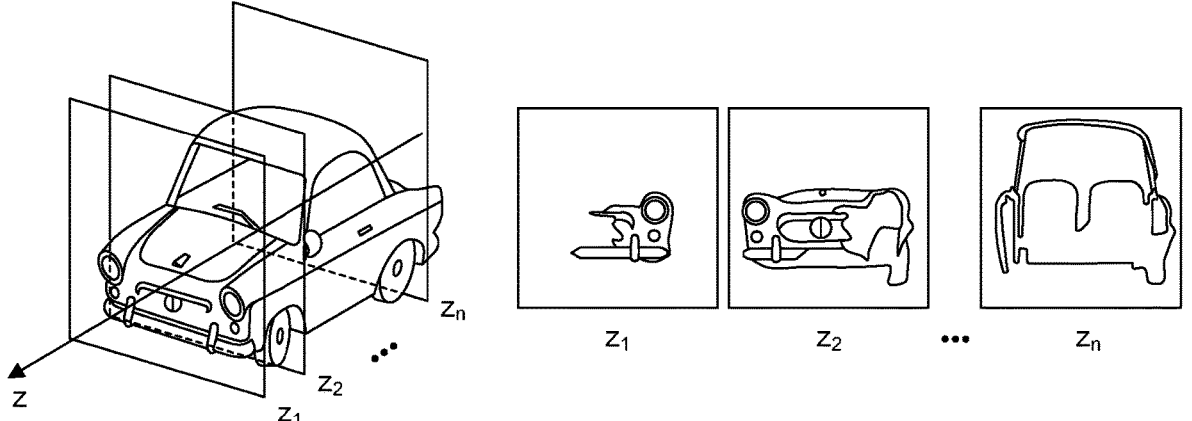
FIG. 2 illustrates an example of a layer-based representation of an object.

The layer-based method for the synthesis of CGHs is a fast-computational method. Multi-Plane Images (MPIs) is a particular case of layer content. MPIs involve a layer description of a 3D scene, almost always resulting from a multi-view scene, but could also possibly be obtained from a computer-generated scene. The MPI "format" can typically be considered as a set of fixed resolution (in pixels) images and a set of metadata gathering parameters like the depth of each image and focal length of the synthesis camera, to name but a few. FIG. 2 illustrates an example of a layer-based 3D scene wherein the 3D object is sliced into a set of n layers, each image layer I being associated to a depth $z_i$.

According to the present principles, MPI layers are applied to 3D images or 3D video contents that are represented in a layer-based format so as to generate Computer Generated Holograms. These layers may be represented as an orthographic projection of the scene or a perspective projection one. To address the issue of occlusion in a 3D scene, the layer-based content is composed of 4 channels, 3 textures R, G and B channels and a fourth channel corresponding to an alpha value. In "*Soft 3d reconstruction for view synthesis*", E. Penner and L. Zhang, Proc. SIGGRAPH Asia, vol. 36, no. 6, 2017, Multi-Plane Image (MPI) representation is described as a perspective projection content with an alpha channel which is not binary. This nonbinary value is here to allow the rendering of different viewpoints of the scene with a smooth transition between objects at the border of an occlusion. The non-binary value helps to describe a probability for a given pixel in a given layer to be present. The non-binary value describes the contribution of a pixel of a layer to the computed CGH.

Figure 3:
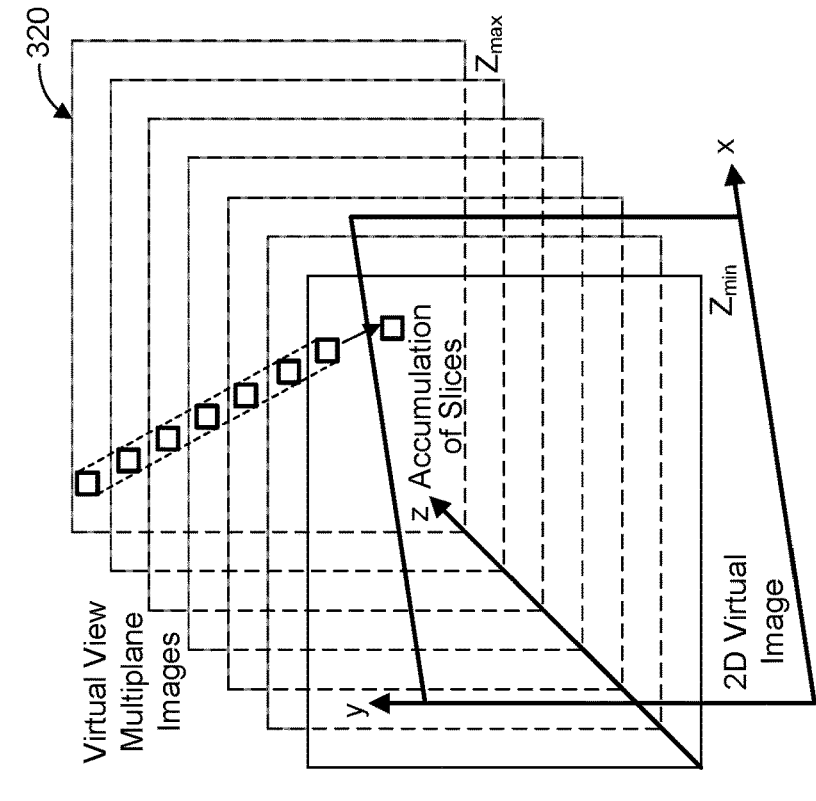
FIG. 3 illustrates a view synthesis according to a given viewpoint from a MPI.
Figure 3:
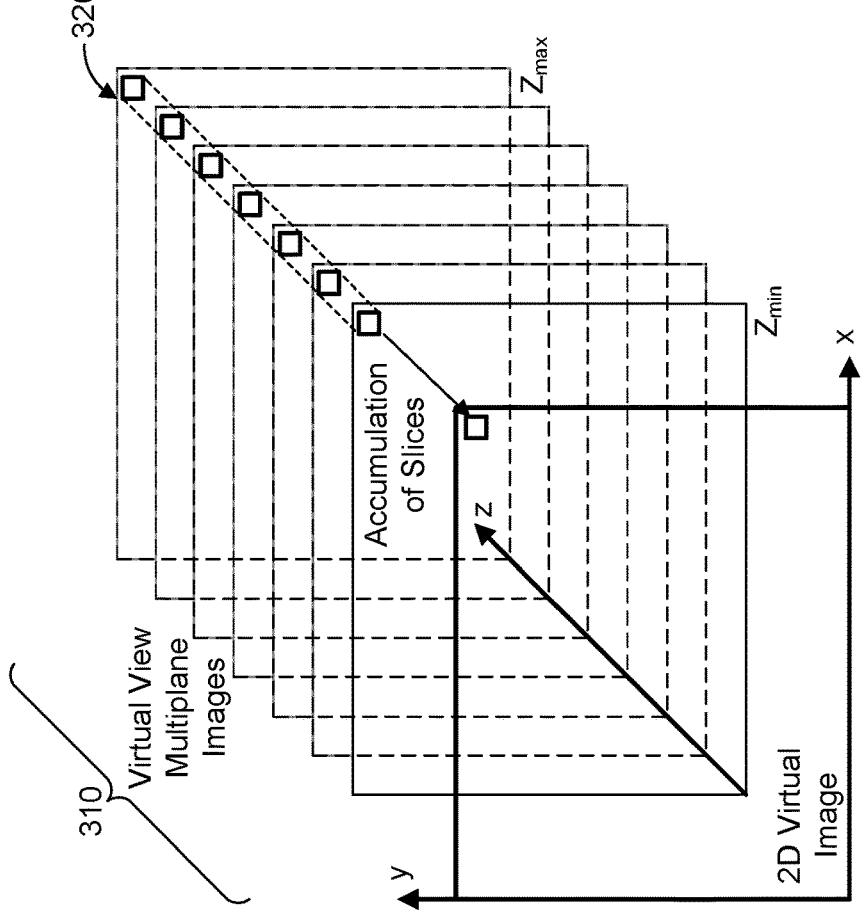

From this sliced representation, it is possible to synthesize any viewpoint located in a limited region around the center of the underlying projection. FIG. 3 illustrates a view synthesis according to a given viewpoint from a MPI. It can be done making use of efficient algorithms ("reversed" Painter's algorithm or as described by B. Vandame and al, in "*PIPELINE FOR REAL-TIME VIDEO VIEW SYNTHESIS,*" Proc. ICME 2020) which blend each layer with the proper weights (transparency) starting from the nearest to the furthest. According to the location of the viewpoint, occultations of objects of the background by objects of the foreground may differ, allowing an observer to experience a parallax effect and to perceive the volume of the scene by lightly moving his head. On the left part of FIG. 3, the different layers 310 of a MPI content are shown. On the right part, the principle of a view synthesis from the MPI is presented. The squares 320 are corresponding to the successive information that are integrated to synthetize one view.

Figure 4:
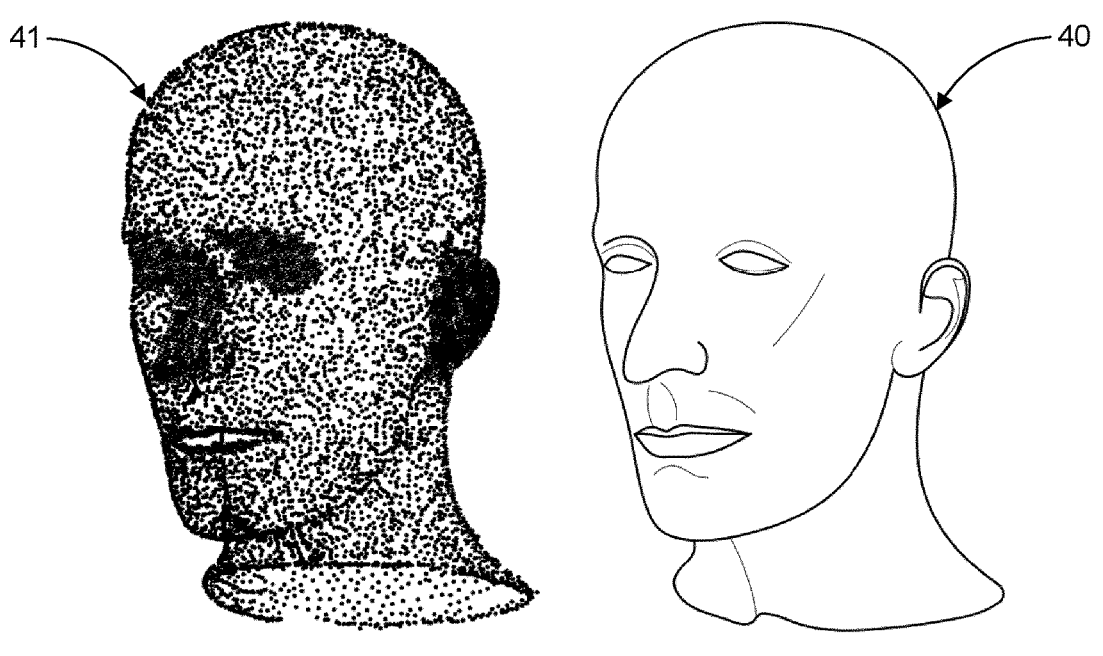
FIG. 4 shows a three-dimension (3D) model of an object and points of a point cloud corresponding to 3D model.

An alternative format to represent a 3D content is point cloud. A point cloud is a set of points with different attributes including texture information (RGB) and position information (XYZ). FIG. 4 shows a three-dimension (3D) model 400 of an object and points of a point cloud 410 corresponding to 3D model 400. 3D model 400 and the point cloud 410 may for example correspond to a possible 3D representation of an object of the 3D scene comprising other objects. Model 400 may be a 3D mesh representation and points of point cloud 410 may be the vertices of the mesh. Points of point cloud 410 may also be points spread on the surface of faces of the mesh. Model 400 may also be represented as a splatted version of point cloud 410, the surface of model 400 being created by splatting the points of the point cloud 410. Model 400 may be represented by a lot of different representations such as voxels or splines. FIG. 4 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.;

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 5:
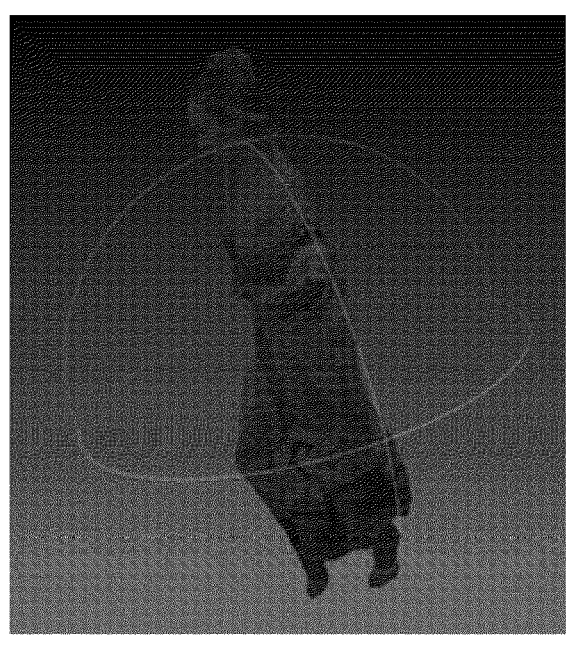
FIG. 5 illustrates an original point cloud of a 3D object and a corresponding 10 layers-based representation of the same 3D object.
Figure 5:
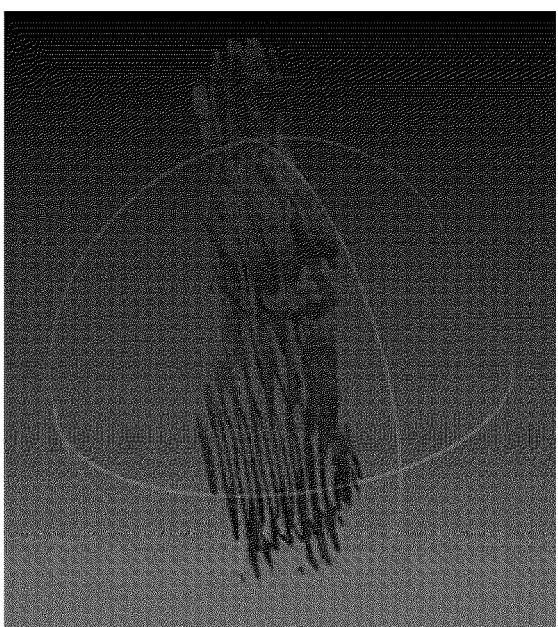

The point cloud approach involves computing the contribution of each point of a 3D scene to the illumination of each pixel of the hologram. Using this model, each point can be either considered as a perfect spherical emitter or described using Phong's model. The light field in the hologram plane is then equal to the summation of all points contributions, for each pixel. The complexity of this approach is proportional to the product of the number of points in the scene by the number of pixels, it thus implies an important computational load, and requires the computation of occlusions separately. The summation of each point and each pixel is described by the equations of Rayleigh-Sommerfeld or Huygens-Fresnel. Thus, synthesizing a CGH from the point cloud is very demanding in term of calculation. There is a huge advantage to convert a point cloud into a set of layers to apply FFT-based operation. But converting a point cloud to a set of layers introduces some errors since original points were not exactly at the depth of a layer. FIG. 5 illustrates the difference between an original point cloud of a 3D object (left) and a corresponding 10 layers based representation of the same 3D object (right). There is always an error introduced when a point is associated to a layer. The more the number of levels, the less the global error is.

With a MPI content or a layer-based point cloud, the number of layers can be high. It is most of the time scaled in a 1/z law and it is spread in between the $Z_{min}$ and $Z_{max}$ values defined for the 3D scene. Depending on the complexity of the scene this number of depth level can be variable, but a usual value can be for instance 256 or 1024 depth layers. For a CGH calculation, having 256 levels of depth requires to compute 256 times the FFT-based propagation of a single layer to the hologram plane. If nothing is done, the processor that will decode the content and try to generate the CGH may not have enough processing power. In consequence, the CGH will not be generated at the right speed which may have an impact on the display and the quality of the hologram visualized.

On the other hand, to avoid this problem of low capacity of the processor, it could be decided to generate the MPI content or the layer-based point cloud with a limited number of layers. This is correct for processors that have low capacities, but this is not optimized for those which could handle more layers. The quality of the final hologram will be lower.

At least some embodiments relate to method for generating a CGH based on a reconstructed layer-based representation of the volumetric video wherein the number of depth layers and a depth value of each of the depth layers used in the reconstructing are adapted to optimize computation time and quality of the CGH. Advantageously, an information representative of at least one set of depth layers is signaled from a content provider to a user display, wherein an information representative of a set of depth layers specifies a number of depth layers and a depth value for each of the depth layers for reconstructing layer-based representation of the volumetric video.

Figure 6:
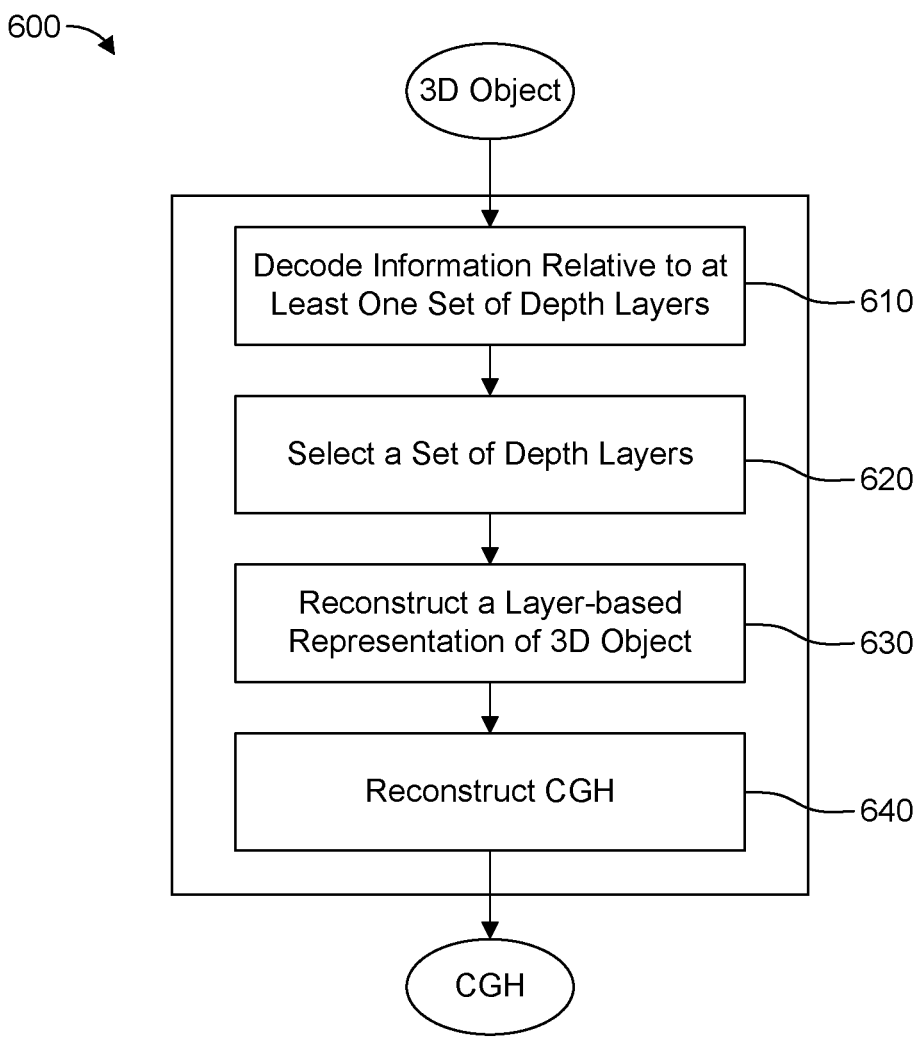
FIG. 6 illustrates a generic method for generating a CGH according to a general aspect of at least one embodiment.

FIG. 6 illustrates an example of a method 600 for determining a CGH from a layered-based reconstructed representation of a volumetric video according to a generic embodiment. In FIG. 6, a data content representative of a volumetric video is accessed. In the following, we may refer to "volumetric video". Volumetric video can include "volumetric content", "volumetric video content", "3D object" or "3D scene" as non-limiting examples. A layer is a group of pixels at a given depth, they are all propagated to the hologram plan using a single FFT-based operation. The layered-based representation of a volumetric video should then comprise a group of layers, each pixel belonging to one layer is considered to have the same depth. The method 600 is compatible with various approaches of a layer-based format. For example, one approach is based on the MPI format which is a layer-based format used to represent a volumetric video content. Another approach is based on point clouds that can be transformed to a layered based representation of a volumetric video content. Corresponding embodiments are described above. Moreover, according to a classical transmission scheme, the data content is encoded in a bitstream to be transmitted from a content provider to a user display. Advantageously, in 610, an information relative to at least one set of depth layers is accessed. An information representative of a set of depth layers specifies a number of depth layers and a depth value for each of the depth layers of the layer-based representation of the volumetric video. Advantageously, the number of depth layers and/or the depth value of each of the depth layers may vary from one set to another set, thus according to different variants, one or more sets of depth layers are defined for the volumetric content that result into one or more layer-based representations of the volumetric video. Advantageously, a set (or several sets) of depth layers associated to the volumetric video is optimized for this volumetric video. By optimized one should understand that for this set of depth layers the number of depth layers is lower (e.g. 10 levels) than or equal to a current value of depth layers (e.g. 256 layers of a full MPI) and that the number of depth layers and the depth of each depth layers have been defined in order to reduce the error introduced by the specified number of depth layers. The way the calculation of the error can be done is described below for different approaches of volumetric content. In a variant, one of the sets depth layers corresponds to the full MPI. For example, the information is decoded from the bitstream comprising the encoded data content. According to a particular feature (not represented on FIG. 6), an indicator specifying whether data content has information representative of at least one set of depth layers is also encoded in the bitstream. At 610, if the indicator specifies that data content has information representative of at least one set of depth layers, information representative of a set of depth layers is then decoded. If not, the method according to the present principles ends. The depth layers set information and the indicator are metadata associated with the volumetric content. After 610, at 620, one set of depth layers is selected among the one or more set of depth layers. According to a particular feature, selecting a set of depth layers comprises determining resources required to reconstruct the layer-based representation of the volumetric video and to reconstruct the CGH using each of at least one sets of depth layers; and selecting the depth layer set with the largest number of depth layers for which the determined resources for reconstructing the layer-based representation of the volumetric video and reconstructing of the CGH fit within a resources budget. According to other variants, any one of the depth layers sets for which the determined resources fit the resources budget is selected. According to yet another variant, if none of the depth layers set satisfies the resources budget constraint, the depth layer set with the smallest number of depth layers is selected. According to yet another variant, if only one set of depth layers is specified, then this set is selected. The determined resources comprise at least one of a number of processing cycles, an amount of decoding time, an amount of memory for reconstructing the CGH from the specified layer-based representation of the volumetric video.

The resources might be determined by a content provider or by an apparatus implementing the method. Similarly, the resources budget comprises at least one of a number of processing cycles available in an apparatus implementing the method, an amount of decoding time available in the apparatus, an amount of memory available in the apparatus. After 620, the layer-based representation of the volumetric video is reconstructed in 630 wherein the layer-based representation of the volumetric video comprises a number of depth layers and a depth value for each of the depth layers corresponding to the number of depth layers and the depth value of the selected set. Various embodiments corresponding to the various approaches of a volumetric content are described in the following. Finally, at 640, the CGH is generated from the reconstructed layered based representation as previously explained based on the FFT-based operation. Advantageously, the method 600 allows the processor to reduce in a clever way the amount of calculation while maintaining a good quality for the CGH calculation. The processor will adapt the CGH calculation to its capacities based on depth layer set information associated to the input volumetric video.

Figure 7:
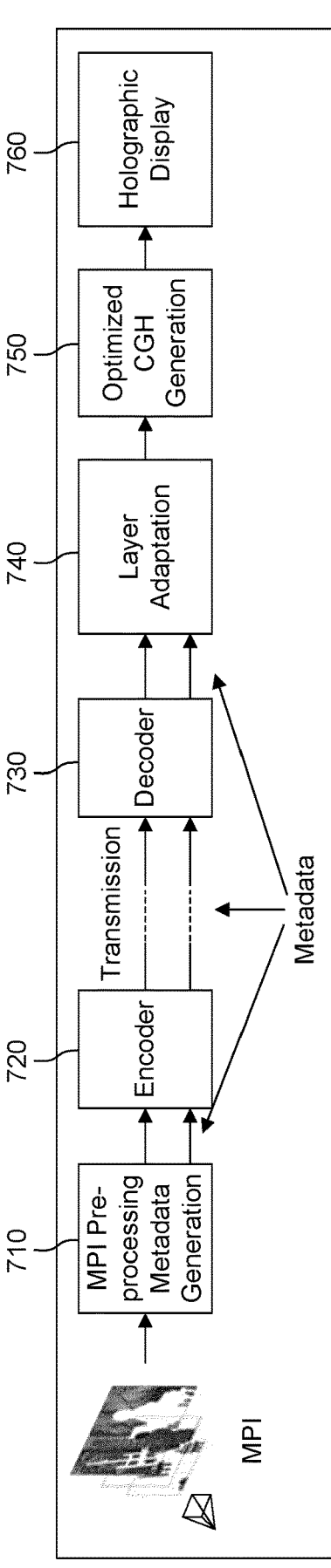
FIG. 7 illustrates the workflow of a holographic system based on a MPI content according to at least one embodiment.

According to a first embodiment, the data content is a MPI content. FIG. 7 illustrates the workflow of a holographic system based on a MPI content according to at least one embodiment. The MPI is at the input of the system. For simplicity in the representation, only a limited number of layers are represented in FIG. 7 but the MPI could have for instance 256 layers corresponding to 256 different levels of depth. A MPI pre-processing 710 is applied to convert the MPI into a format that will be compressed using standard video coder 720. For instance, the MPI can be converted into an atlas of patches such as in MIV compression scheme. In 710, a set of metadata is generated that specifies, according to the present principles, a number of depth layers and a depth value for each of the depth layers. According to

13

Figure 8:
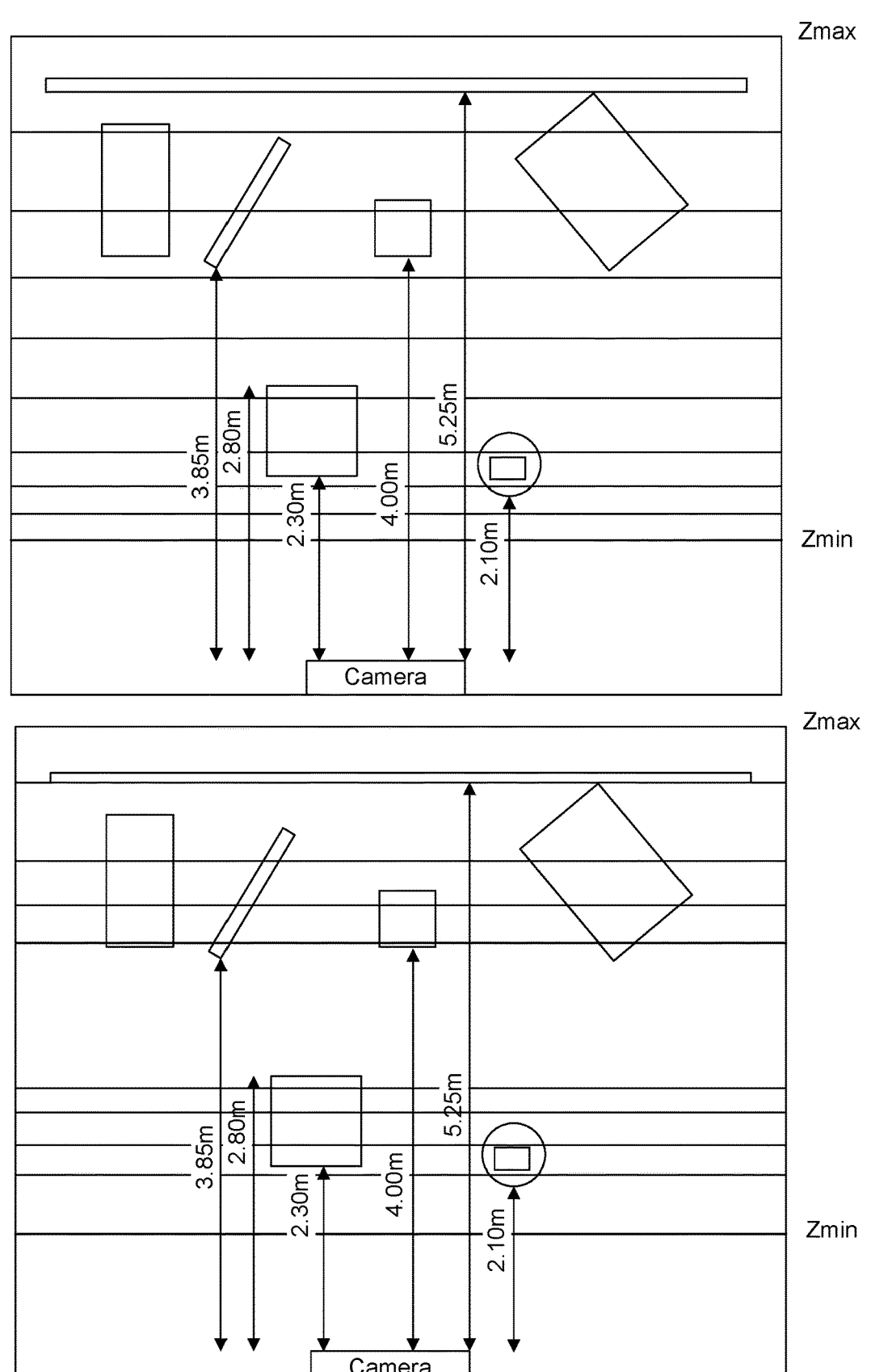
FIG. 8 illustrates a regular layer repartition between $Z_{min}$ and $Z_{max}$, and an optimized repartition of layers based on the content according to at least one embodiment.

14 non-limiting examples, the number of depth layers is 10 or 50. According to a particular feature, one or more sets of metadata are generated adapted to different numbers of depth layers. The way to calculate the values of these 10 or 50 depth levels is dependent on the content. As illustrated in FIG. 8, the "interesting part" of a content is not spread homogeneously along the depth axe of the scene. This figure corresponds to the Painter scene where there are two main areas near the background and in the foreground with an empty space in the middle. Some parts of the scene are more "of interest" compared to others, the foreground for instance. Such interesting part must be well represented when the number of layers is reduced. On contrary there is no need to place some layers where there is no physical objects. The lower part of FIG. 8 illustrates an optimized way to place the layer compared to a regular layer repartition between $Z_{min}$ and $Z_{max}$ on the upper part of the FIG. 8. During the pre-processing 710, the analysis of the scene (based on depth information) will help to define an optimized position of layers for a given number of layers. An information representative of a set of depth layers is then created that associate with a 10 layers format, the 10 optimized depth values. A same processing is for instance performed to define a set of 25 depth layers or a set of 50 depth layers. For each of them, an information representative of a set of depth layers is created and it can be transmitted with the content as metadata.

Following the workflow in FIG. 7, the metadata is inserted into the bitstream, transmitted and received at the decoder side. The metadata is extracted. Based on the capacities of the processor that will synthesize the CGH, the number of layers can be adapted using the depth layers set information contained in the metadata. In case of a MIV compression scheme, the content is compressed as a set of patches. In some of the use cases of the MIV technology, the patches are decoded in order to be able to render some viewpoint (e.g. for HMD application, 2 viewpoints corresponding to the two eyes are required in real-time).

In case of a CGH application, the MIV decoder/renderer should deliver a set of reconstructed layers. If the processor has large capacities, all the layers of the MPI that were present at the encoder side will be reconstructed. According to the present principles, if the processor has not enough capacities, a number of layers as specified in the metadata will be reconstructed.

Accordingly, as previously exposed with the generic embodiment of FIG. 6, the decoder/renderer determines in 730 whether the data content has metadata to specify one or more sets of depth layers. If such metadata is specified, the decoder/renderer decodes the metadata to obtain one or more sets of depth layers. Each of the sets specifies a number of depth layers, and a depth value for each of those depth layers. In 730, the decoder/renderer also decodes each relevant patch of the MIV content from an atlas of patches of the sequence of MPI. According to different variants, this may include all patches available for the content, or a subset of patches needed to generate the current CGH. For example, if the CGH will represent a subset of the scene, then only a relevant subset of the available patches may be needed. In 740, the layer adaptation of the MPI is processed. The selection of a set of depth layers is responsive to the resources of the processor of the decoder/renderer. If the processor has enough resources (e.g. CPU cycles, decoding time, memory, and/or other resources) to generate the CGH using the full MPI (i.e. the original number of MPI layers specified in the content or, in a particular variant also specified in one of the set of depth layers), then all layers are reconstructed, and the resulting full MPI is used to generate the CGH. If the processor does not have enough resources to generate the CGH for the full MPI, then the CGH is generated using a number of depth layers, lower than the number of layers of the full MPI, as specified in a selected one of the sets of depth layers. The selection may be based on the available resources at the decoder/renderer. For example, the decoder/renderer may estimate the resources required to generate the CGH using each of the available sets of depth layers, and may select one of the sets of depth layers to fit within an available resource budget (e.g. so that an available number of CPU cycles, an available amount of decoding time, and/or an available amount of memory are not exceeded). The decoder/renderer may, for example, select the depth layer set with the largest number of depth layers for which the resource estimate for reconstruction of the depth layers and subsequent generation of the CGH fits within the available resource budget. If only one set of depth layers is specified by the metadata, then the decoder/renderer may determine to use that set. For the selected set of depth layers, the corresponding set of depth layers (or set of MPI slices) is reconstructed by re-assigning each decoded patch to the nearest depth layer in the selected set. For example, for each relevant patch, its depth value is compared to the depth value of the layers of the selected set to find the nearest one, and then the contribution of that patch is added to the corresponding depth layer in the set of depth layers. Finding the nearest depth value may involve calculating the differences between the z value of the relevant patch and the z values of the layers of the selected set of depth layers, and finding the smallest difference. Finding the nearest depth value can involve (e.g. as an alternative) calculating the differences between the 1/z value of the relevant patch and the ½ values of the layers of the selected set of depth layers and finding the smallest difference. Then the patch is added to the depth layer corresponding to the nearest depth value following the criteria for the nearest depth, and each layer of the set of depth layers is reconstructed using the patches assigned to the layer. Finally in 750, the reconstructed layered based representation of the content is used to generate the CGH which is then displayed in 760.

For the sake of completeness, a non-limiting example of a method to define the optimized set of depth layers is now described. The method is based on an iterative solution inspired from K-means as used in "*Some Methods for classification and Analysis of Multivariate Observations*", by MacQueen J. B., in *Proceedings of 5th Berkeley Symposium on Mathematical Statistics and Probability* 1, *University of California Press*. pp. 281-297, or in "*Least squares quantization in PCM*", by Lloyd, Stuart P. in *IEEE Transactions on Information Theory*. 28 (2): 129-137. Though the convergence is ensured, the method can alternatively be stopped after a determined number of iterations.

Considering a Multi-plane image (MPI) of depth D, and for each layer d, $1 \leq d \leq D$, the total weight of its alpha component being:

$$A_d = \sum_{u,v} \alpha_{uvd}$$

Considering a target number of planes P<D, an initialization step consists in resampling the actual (non-empty) depth range of the MPI. To this end, let $d_{near}$ and $d_{far}$ be respectively the nearest and farthest non-empty layer indices. I.e., assuming the planes are back-to-front ordered:

$$d_{near} = \max_d\{d: A_d \neq 0\} \text{ and } d_{far} = \min_d\{d: A_d \neq 0\}$$

The previous definition can be modified with the introduction of a threshold T>0:

$$d_{near} = \max_d\{d: A_d > T\} \text{ and } d_{far} = \min_d\{d: A_d > T\}$$

Now let $$\{z_k^{(1)}\}_{1\leq k\leq K}$$

denotes the initial depth sampling, that should preferably be uniform in 1/z:

$$\forall p \in [\![1, P]\!], z_p^{(1)} = \left(\frac{1}{z_{d_{far}}} + \frac{p-1}{P-1} \times \left(\frac{1}{z_{d_{near}}} - \frac{1}{z_{d_{far}}}\right)\right)^{-1}$$

Then, the iterative process comprises, for each iteration i≥1, two steps, namely an assignment step and an update step.

In the assignment step, every pixel of the MPI is reassigned to the slice $$S_p^{(i)}$$

located at depth $$z_p^{(i)}$$

that presents the smallest error in 1/z:

$$S_p^{(i)} = \left\{(u, v, d): \forall k \neq p, \left|\frac{1}{z_d} - \frac{1}{z_p^{(i)}}\right| \leq \left|\frac{1}{z_d} - \frac{1}{z_k^{(i)}}\right|\right\}$$

Each pixel uvd is assigned to a single slice even in the case of equal scores. This advantageously ensures the convergence.

After the assignment step, in the update step, the depth of each slice is updated to take into account the actual location of its content. To this end we compute a weighted average with alpha values:

$$\forall p \in [\![1, P]\!], z_p^{(i+1)} = \left(\frac{\sum_{uvd \in S_p^{(i)}} \frac{\alpha_{uvd}}{z_d}}{\sum_{uvd \in S_p^{(i)}} \alpha_{uvd}}\right)^{-1}$$

The algorithm converges, yet it can be interrupted after a given number of iterations. Eventually the initial depth values $\{z_d\}_{d\leq D}$ are discarded, and the new MPI made of the P final planes is returned.

According to a variant embodiment, all or some of the 1/z expressions are replaced by z expressions. The reassignment and update steps should however be consistent with each other.

According to another variant embodiment, the initialization can be performed otherwise, e.g. on a random basis.

According to another variant embodiment, the contribution of input pixels is split in half when two slices exhibit the same error. This is performed by halving the initial alpha value. However, this compromises the convergence property of the approach.

Figure 9:
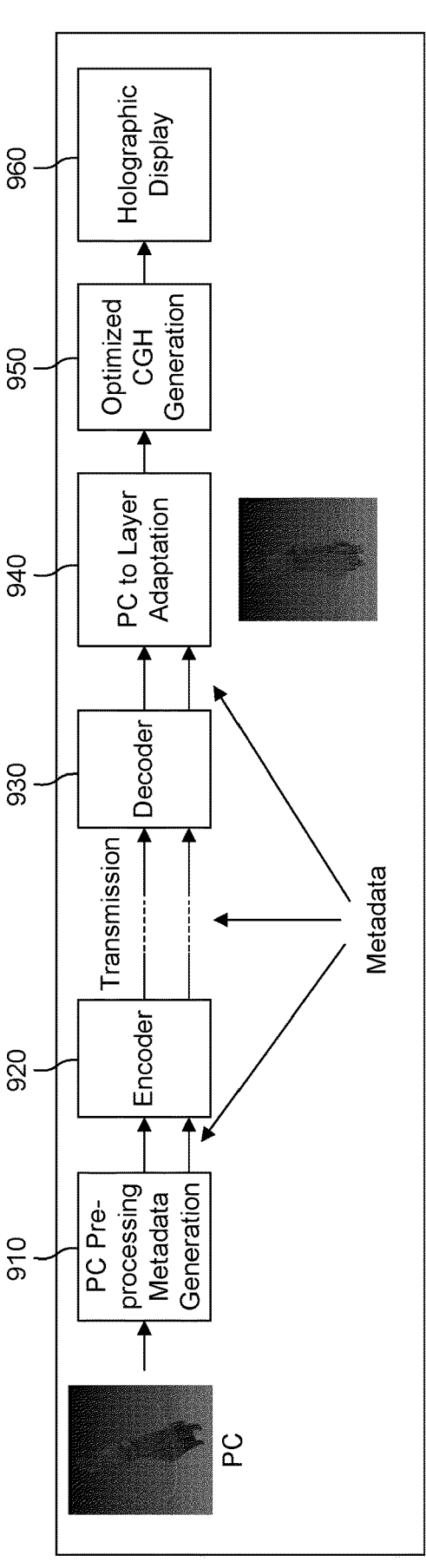
FIG. 9 illustrates the workflow of a holographic system based on a MPI content according to at least one embodiment.

According to a second embodiment, the data content is a point cloud PC content. FIG. 9 illustrates the workflow of a holographic system based on a PC content according to at least one embodiment. This embodiment is considering a point cloud as input. Compared to the MPI, there is no layer already defined, points are not associated to any layer. In 910, PC pre-processing defines based on the point cloud, what are the optimized depth values for a given number of depth layers such as for example 10 layers or 50 layers. An example of a method for obtaining an optimized layered-based representation of a PC is given in the following. However, the present principles are not limited to this method and any means to define this optimization is compatible with the present principles. An information representative of a set of depth layers is then created that associate with a 10 layers format, the 10 optimized depth values. A same processing is for instance performed to define a set of 50 depth layers. For each of them, an information representative of a set of depth layers is created and can be transmitted with the content as metadata. In case of a point cloud source, the compression scheme 920 can be for instance the V-PCC compression scheme as developed in MPEG. In 930, the PC is decoded and in 940, a conversion of the transmitted data has to be performed to prepare the content for the CGH calculation. Since in case of PC source there is no layer defined at the input, the decoded metadata is used to get one or more set of layers. As previously, the capacities of the processor of the decoder/renderer will be used to select which one of the available sets in the metadata will be selected. Based on the selected set of depth layers, the number of layers is processed at the "PC to layer adaption" step 940. Each decoded point of the point cloud is assigned to the layer corresponding to the nearest depth. Then, in 950 the CGH is calculated before being sent to the holographic display 960.

For the sake of completeness, a non-limiting example of a method to define the optimized set of depth layers from a PC is now described. In this second embodiment, a similar method to the method of the first embodiment is implemented wherein the input scene is described as a point cloud, i.e. an unordered set of 3D points $\{xyz_n, rbg_n\}_{1\leq n\leq N}$ (no alphas here) instead of an MPI.

Considering a target number of P planes for the output MPI, the initialization step comprises resampling the input point cloud. To this end, a coordinate system that corresponds to the reference camera of the output MPI shall be defined. Let's assume in the following that the xyz coordinates of the 3D points are expressed in that coordinate system. In addition, a camera model shall also be defined for the reference camera of the output MPI. Let's assume that this reference camera is characterized as a pinhole camera and let $K \in \mathbb{R}^{3\times3}$ denotes its intrinsic matrix.

Now let $Z_{min}$ and $Z_{max}$ be respectively the smallest and largest z-coordinates of the input points:

$$z_{min} = \min_n\{z_n\} \text{ and } z_{max} = \max_n\{z_n\}$$

Now let $$\{z_p^{(1)}\}_{1 \le p \le P}$$

denote the initial depth sampling, that should preferably be uniform in 1/z:

$$\forall\, p \in [\![1, P]\!], \, z_p^{(1)} = \left(\frac{1}{z_{max}} + \frac{p-1}{P-1} \times \left(\frac{1}{z_{min}} - \frac{1}{z_{max}}\right)\right)^{-1}$$

Then, the iterative process comprises, for each iteration $i \ge 1$, two steps, namely an assignment step and an update step.

In the assignment step, each 3D point xyz is assigned to the slice $$S_p^{(i)}$$

located at depth $$z_p^{(i)}$$

that presents the smallest error in 1/z:

$$S_p^{(i)} = \left\{(x, y, z): \forall\, k \ne p, \left|\frac{1}{z} - \frac{1}{z_p^{(i)}}\right| \le \left|\frac{1}{z} - \frac{1}{z_k^{(i)}}\right|\right\}$$

Each 3D point xyz is assigned to a single slice even in the case of equal scores. This advantageously ensures the convergence.

After the assignment step, in the update step, the depth of each slice $$S_p^{(i)}$$

of the MPI is updated to take into account the actual position in z of its content:

$$\forall\, p \in [\![1, P]\!], \, z_p^{(i+1)} = \left(\frac{1}{|S_p^{(i)}|} \sum_{xyz \in S_p^{(i)}} \frac{1}{z}\right)^{-1}$$

Where |•| denotes the cardinality of a set.

The algorithm converges, yet it can be interrupted after a given number of iterations.

Eventually the point cloud is projected onto the discrete MPI grid; i.e. each 3D point xyz is turned into a given MPI pixel uvd, where u and v are respectively the nearest integers of real numbers u' and v' defined by:

$$z.\begin{pmatrix} u' \\ v' \\ 1 \end{pmatrix} = K.\begin{pmatrix} x \\ y \\ z \end{pmatrix}$$

and d denotes the index of the appropriate slice:

$$d = \underset{p}{\operatorname{argmin}} \left|\frac{1}{z} - \frac{1}{z_p^{final}}\right|$$

According to a variant, depending on the MPI resolution, several 3D points might be merged into a single MPI pixel. As for RGB values there are two ways to perform that fusion operation. A first solution consists in blending the color values corresponding to the different 3D points to be merged together. Another solution consists in assigning the MPI pixel with the color of the point that presents the lowest z value.

As previously, according to a variant embodiment, all or some of the 1/z expressions are replaced by z expressions. The reassignment and update steps should however be consistent with each other.

According to another variant embodiment, the depth initialization can be performed otherwise, e.g. on a random basis.

Even if different variants of a first and a second embodiment have being described respectively for reconstructing a layered based representation a MPI and a PC content according to the specified layers, other variation can be completed with the scope of the present principles:

a PC or an MIV/patch based scene representation are used as input, and you have some standard way to convert that to an MPI representation (e.g. a 'full' MPI). This might be based on some standard sampling, i.e. 256 MPI slices but you don't need to specify 256 depths, it's from a formula. Advantageously, one or more depth sets are specified for generating a reduced MPI representations, where the depth values are specified (e.g. 25-slice MPI, where the metadata specifies 25 depth values).

a PC or an MIV/patch based scene representation are used as input, and you have one or multiple depth sets where the metadata specifies the number of depth values (e.g., number of MPI slices) and the depth of each slice as in the described embodiments.

an MPI based representation is used from the start (i.e. it comes down to the client as an MPI, likely in some compressed form) and one or multiple depth sets that would allow you to generate reduced MPI representations, each depth set specifying a set of specific depth values to which the original MPI would be remapped/resampled.

a PC or an MIV/patch based scene representation are used as input. The metadata specifies for at least one depth set, where the at least one depth set is indicated for generating a CGH from the scene representation. (Possibly you have some additional depth sets which could be indicated for non-CGH rendering, or perhaps for particular rendering device types).

According to an embodiment, the above-described embodiments for determining a CGH from a layered-based reconstructed representation of a volumetric video can be used in a transmission system wherein the 3D scene is transmitted through a network as a set of MPIs and a CGHs is reconstructed from the transmitted and decoded set of MPIs. According to a variant, the set of MPIs is compressed following a MIV compression scheme (MDS20001_WG04_N00049, Text of ISO/IEC DIS 23090-12 MPEG Immersive Video).

In this case, the MPI is not transmitted as such but it is converted into a patch-based content. Each layer is converted into a set of patches. For initial use cases of MIV technology, at the decoder side, only a view synthesis of a given viewport was foreseen. The MPI structure that could be the input of the compression process is not supposed to be rendered at the decoding side. On the contrary, in case of the CGH application, a number of layers and a depth value for each of the layers are adapted to the capacities of the device that generate the CGH.

A set of metadata is then constructed by associating to a set of depth layers, an information specifying a number of depth layers and a depth value for each of the depth layers of a layer-based representation of the volumetric video. This metadata stream is transmitted with the MIV content. At the decoding side, based on these metadata, the layer-based representation of the volumetric video as specified by the number of depth layers and a depth value for each of the depth layers is reconstructed. Some variants of this embodiment are described below. It should be noted that the embodiments below are described in the case of volumetric content rendered using Computer Generated Holograms, however these embodiments could be applied to any other volumetric content rendering and are not limited to Computed Generated Holograms. As will be seen below, the methods and systems described below can be applied in a general manner to any volumetric content representation.

Figure 10:
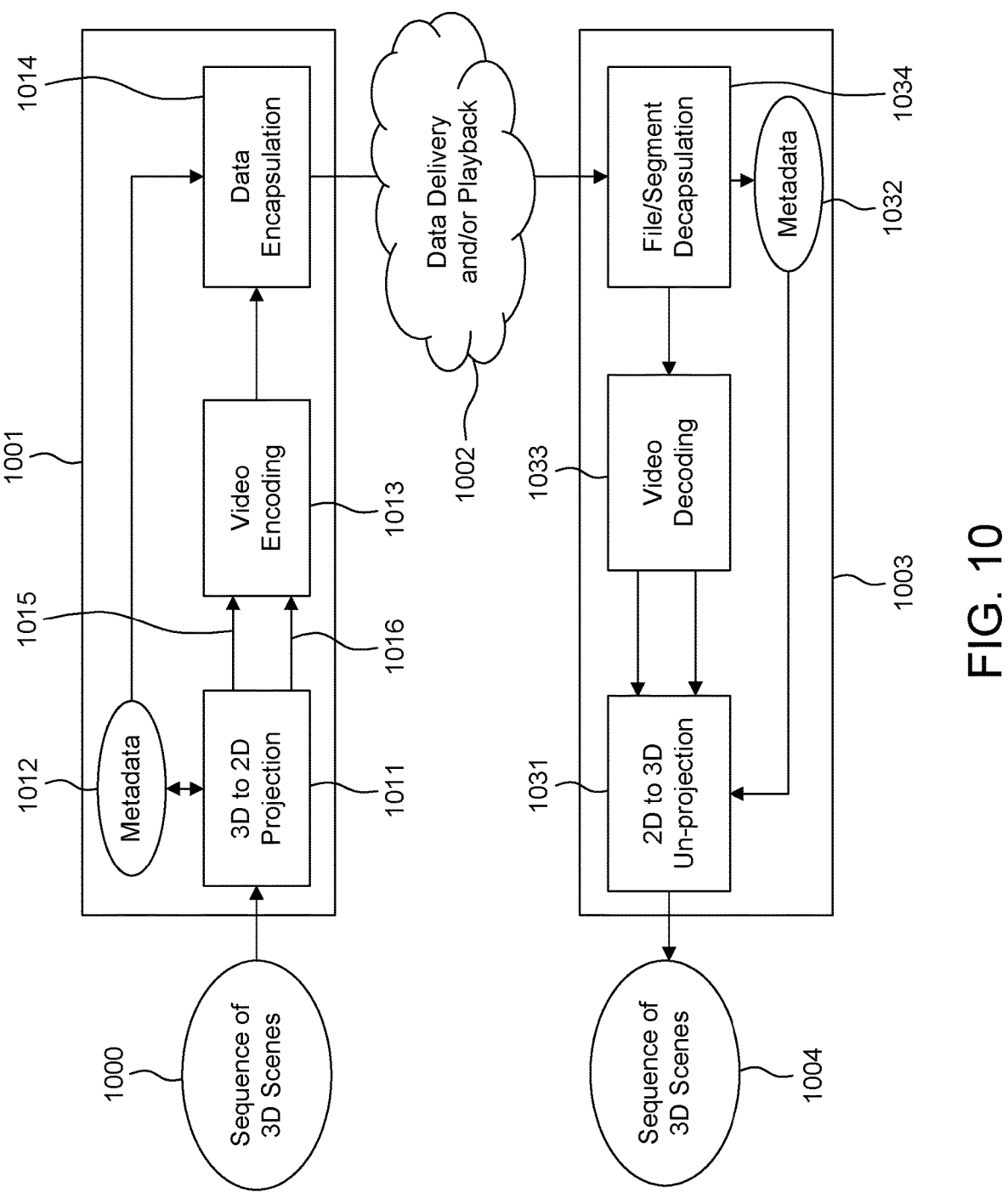
FIG. 10 shows a non-limitative example of the encoding, transmission and decoding of data representative of a sequence of 3D scenes, according to a non-limiting embodiment of the present principles.

FIG. 10 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 1000 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 1000 is provided to an encoder 1001. The encoder 1001 takes one 3D scenes or a sequence of 3D scenes as input and provides a bit stream representative of the input. The bit stream may be stored in a memory 1002 and/or on an electronic data medium and may be transmitted over a network 1002. The bit stream representative of a sequence of 3D scenes may be read from a memory 1002 and/or received from a network 1002 by a decoder 1003. Decoder 1003 is inputted by said bit stream and provides a sequence of 3D scenes, for instance in a point cloud format.

Encoder 1001 may comprise several circuits implementing several steps. In a first step, encoder 1001 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 1011 provides at least one two-dimensional frame 1015 for a 3D scene of sequence 1000. Frame 1015 comprises color information and depth information representative of the 3D scene projected onto frame 1015.

In a variant, color information and depth information are encoded in two separate frames 1015 and 1016.

Metadata 1012 are used and updated by projection circuit 1011. Metadata 1012 comprise information about the projection operation (e.g. projection parameters) and about the way color and depth information is organized within frames 1015 and 1016.

A video encoding circuit 1013 encodes sequence of frames 1015 and 1016 as a video. Pictures of a 3D scene 1015 and 1016 (or a sequence of pictures of the 3D scene) is encoded in a stream by video encoder 1013. Then video data and metadata 1012 are encapsulated in a data stream by a data encapsulation circuit 1014.

Encoder 1013 is for example compliant with an encoder such as:

- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data stream is stored in a memory that is accessible, for example through a network 1002, by a decoder 1003. Decoder 1003 comprises different circuits implementing different steps of the decoding. Decoder 1003 takes a data stream generated by an encoder 1001 as an input and provides a sequence of 3D scenes 1004 to be rendered and displayed by a volumetric video display device, like a Head-Mounted Device (HMD) or an Holographic Display. In case of an Holographic display, there is one more step before the display performed by the decoder or an additional module that determines or calculates the CGH from the decoded content. Decoder 1003 obtains the stream from a source 1002. For example, source 1002 belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 1003 comprises a circuit 1034 for extract data encoded in the data stream. Circuit 1034 takes a data stream as input and provides metadata 1032 corresponding to metadata 1012 encoded in the stream and a two-dimensional video. The video is decoded by a video decoder 1033 which provides a sequence of frames. Decoded frames comprise color and depth information. In a variant, video decoder 1033 provides two sequences of frames, one comprising color information, the other comprising depth information. A circuit 1031 uses metadata 1032 to un-project color and depth information from decoded frames to provide a sequence of 3D scenes 1004. In case of Holographic content, the circuit 1031 calculates the CGH from the decoded content (color and eventually depth) according to any one of the embodiments described above.

Sequence of 3D scenes 1004 corresponds to sequence of 3D scenes 1000, with a possible loss of precision related to the encoding as a 2D video and to the video compression. For instance, the sequence 1004 is obtained thanks to a holographic display.

Figure 11:
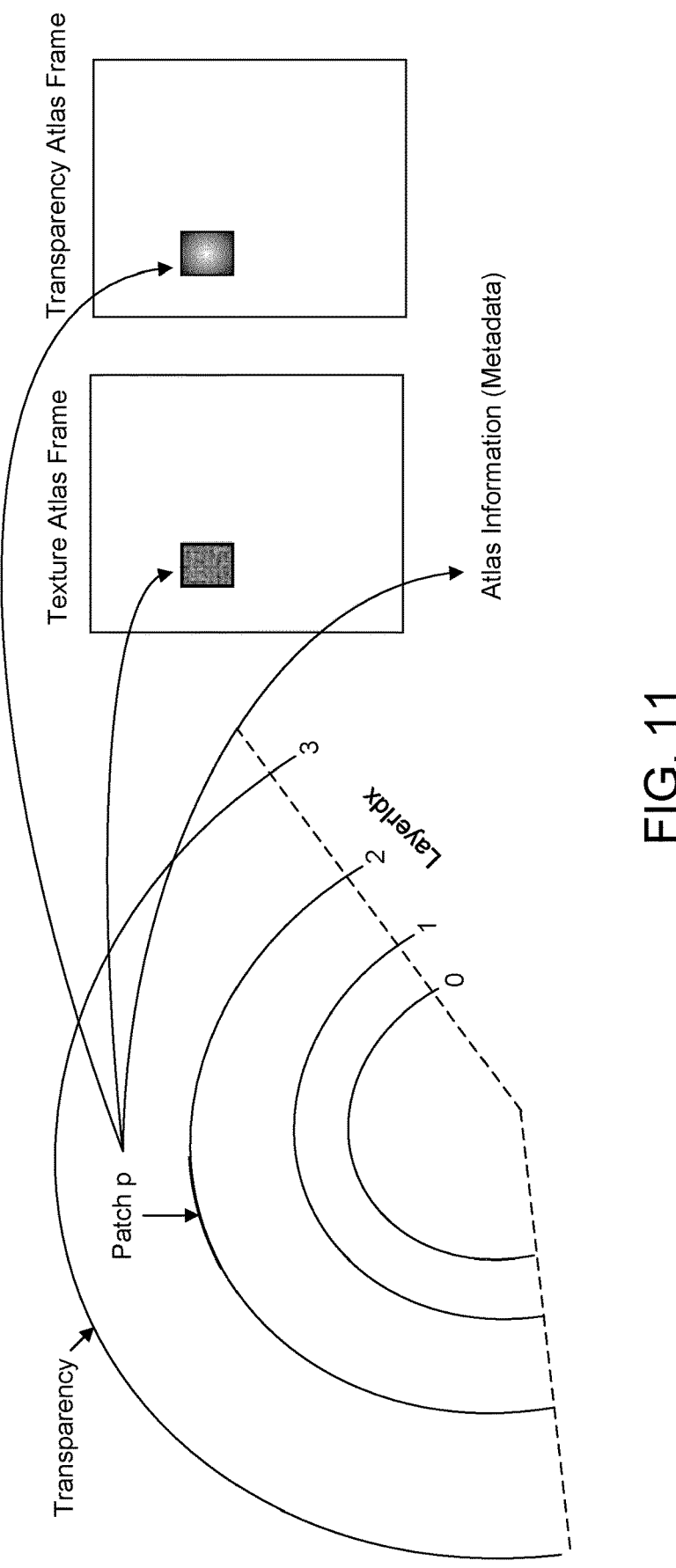
FIG. 11 illustrates the construction of an MPI-based atlas representative of a volumetric scene, according to a non-limiting embodiment of the present principles.

FIG. 11 illustrates the construction of an MPI-based atlas representative of a volumetric scene. A multiplane image (MPI) is a layered representation of a volumetric scene where each layer is actually a slice of the 3D space of the scene. Each slice is sampled according to an underlying central projection (e.g. perspective, spherical, . . . ) and a sampling law which defines the interlayer spacing. A layer comprises texture (i.e. color information) as well as transparency information of any 3D intersecting object of the scene. From this sliced representation, it is possible to recover/synthesize any viewpoint located in a limited region around the center of the underlying projection. It can be performed making use of efficient algorithms (e.g. "reversed" Painter's algorithm) which blends each layer with the proper weights (i.e. transparency) starting from the nearest to the furthest layer. Such techniques may run very much faster than other known view synthesis processes. The MPI may be conveyed as two video bitstreams respectively encoding texture and transparency patch atlas images. The depth (i.e. the geometry data corresponding to a distance between projected points of the 3D scene and the projection surface or projection center) of each patch is constant (because of the principles of MPI encoding) and may be signaled, for example, in an atlas information data stream and/or in metadata of one of the data streams or in metadata of one data stream encoding the two sequences of atlases in different tracks. Below is an example of a syntax for signaling the depth (pdu_depth_start) of the patch p located at spatial position pdu_2d_pos_x, pdu_2d_pos_y in the atlas:

```
patch_data_unit( tileID, p ) {
    pdu_2d_pos_x [ tileID ][ p ]
    pdu_2d_pos_y [ tileID ][ p ]
    ...
    pdu_depth_start[ tileID ][ p ]
    ....
}
```

Figure 12:
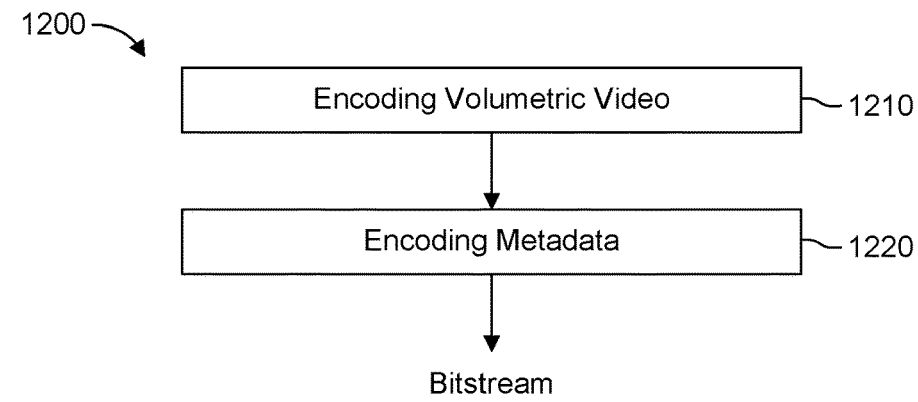
FIG. 12 shows a block diagram of a method for encoding a volumetric video according to an embodiment of the present principles.

FIG. 12 shows a block diagram of a method 1200 for encoding data content representative of a 3D scene/volumetric content according to an embodiment of the present principles. The volumetric video to encode is inputted to the process. At 1210, the current video content is encoded in a bitstream. Before encoding, the current video content is pre-processed as explained in step 710 of FIG. 7 and 910 of FIG. 9 and metadata are generated for at least one optimized layered-based representation of the volumetric content. As previously explained, according to a first embodiment the current video is a MPI, according to a second embodiment the current video content is a PC.

According to an embodiment, an indicator specifying whether data content has information representative of at least one set of depth layers and/or an information representative of a set of depth layers specifying a number of depth layers and a depth value for each of the depth layers for a layer-based representation of the volumetric video is encoded as metadata in 1220.

An example of an embodiment for encoding an MPI is described below in reference with FIG. 14.

According to an embodiment of the present principles, a MPI is encoded according to the V3C/MIV specification. The set of depth layers is an information which is related to the complete frame. Besides, since there is no need to modify this set of metadata each frame, but it must be re-evaluated regularly in order to be adapted to the modifications in the content. In case of a scene cut for instance, this has always to be re-evaluated. Then the frequency of re-evaluation can be every GOP or even less than this. The set of metadata will be sent regularly on the same basis. Thus, the metadata is preferably inserted in the V3C/MIV specification at the level "common atlas data". The V3C/MIV specification is modified as follow by adding a new flag in the 8.2.1.6 section and a new section 8.2.1.6.9 to insert these metadata. Accordingly, a flag and a data structure are added in the Common Atlas Sequence Parameter Set MIV extension syntax as follows (added syntax elements are underlined):

8.2.1.6 Common Atlas Frame MIV Extension Syntax

| | Descriptor |
|---|---|
| caf_miv_extension( ) { | |
|   if( nal_unit_type == NAL_IRAP_CAF ) { | |
|     miv_view_params_list( ) | |
|   } else { | |
|     came_update_extrinsics_flag | u(1) |
|     came_update_intrinsics_flag | u(1) |
|     <u>came update set layer flag</u> | <u>u(1)</u> |
|     if( casme_depth_quantization_params_present_flag ) | |
|       came_update_depth_quantization_flag | u(1) |
|     if( came_update_extrinsics_flag ) | |
|       miv_view_params_update_extrinsics( ) | |
|     if( came_update_intrinsics_flag ) | |
|       miv_view_params_update_intrinsics( ) | |
|     if( came_update_depth_quantization_flag ) | |
|       miv_view_params_update_depth_quantization( ) | |
|     if( came update set layer flag ) | |
| <u>:</u> |       <u>miv set depth layer update ( )</u> |
|   } | |
| } | |

The added flag "came_update_set_layer_flag" allows the definition of an indicator specifying whether data content has information representative of at least one set of depth layers. For instance, a value=1 indicates that the syntax structure for specifying a set of depth layers is present, a value=0 indicates the syntax structure for specifying a set of depth layers is not present. The syntax structure for specifying a set of depth layers is given in a depth layer update MIV extension syntax shown below.

8.2.1.6.9 MIV Depth Layer Update Syntax

| | Descriptor |
|---|---|
| miv set depth layer update( ) { | |
| miv set depth layer updates minus1 | u(16) |
| for( i = 0; i <= miv set depth layer updates minus1; i++ ) { | |
| miv depth layer updates minus1 [ i ] | u(16) |
| for( j = 0; j <= miv depth layer updates minus1; j++ ) { | |
| depth layer value[i, j ] | u(16) |
| } | |
| } | |
| } | |

The semantic of the MIV depth layer update could be specified as follows: came_update_set_layer_flag equal to 1 indicates that miv_set_depth_layer_update( ) is present in this syntax structure. came_update_set_layer_flag equal to 0 indicates that miv_set_depth_layer_update( ) is not present in this syntax structure. If came_update_set_layer_flag is equal to 1, miv_set_depth_layer_updates_minus1 indicates the number of sets depth layers present in the structure. For each set of depth layer i, miv_depth_layer_updates_minus1 [i] indicates the number of depth layer in this set of depth layer i. depth_layer_value[i,j] indicates the depth value of the depth j of the set of depth layer i.

According to an embodiment of the present principles, a PC is encoded according to the V3C specification. As above, the set of metadata will be sent regularly on the basis of a GOP. The set of depth level is an information which is related to the complete frame. It has to be inserted in the V3C specification at the level "common atlas data". The V3C specification is modified as follow by adding a new flag in the 8.3.6.2.1 section to insert these metadata Accordingly, a flag and a data structure are added in the General Atlas Frame Parameter Set RBSP (Raw Byte Sequence Payload) syntax as follows (added syntax elements are underlined):

8.3.6.2.1 General Atlas Frame Parameter Set RBSP Syntax

| | Descriptor |
|---|---|
| atlas_frame_parameter_set_rbsp( ) { | |
| afps_atlas_frame_parameter_set_id | ue(v) |
| afps_atlas_sequence_parameter_set_id | ue(v) |
| atlas_frame_tile_information( ) | |
| afps_output_flag_present_flag | u(1) |
| afps_num_ref_idx_default_active_minus1 | ue(v) |
| afps_additional_lt_afoc_lsb_len | ue(v) |
| afps_lod_mode_enabled_flag | u(1) |
| afps_raw_3d_offset_bit_count_explicit_mode_flag | u(1) |
| afps_extension_present_flag | u(1) |
| if( afps_extension_present_flag ) | |
| afps_extension_8bits | u(8) |
| if( afps_extension_8bits ) | |
| while( more_rbsp_data( ) ) | |
| afps_extension_data_flag | u(1) |
| rbsp_trailing_bits( ) | |
| afps_set_layer_flag | u(1) |
| if( afps_set_layer_flag) { | |
| pc_set_depth_layer_updates_minus1 | U(16) |
| for( i = 0; i <= pc_set_depth_layer_updates_minus1; i++ ) { | |
| pc_depth_layer_updates_minus1 [ i ] | U(16) |
| for( j = 0; j <= pc_depth_layer_updates_minus1; j++ ) { | |
| Pc_Depth_layer_value[i, j ] | U(16) |
| } | |
| } | |
| } | |

V3C depth layer update semantic included in the atlas_frame_parameter_set_rbsp( ) descriptor is defined as follows:

afps_set_layer_flag equal to 1 indicates that a number of sets of depth layer is present in this syntax structure. afps_set_layer_flag equal to 0 indicates that no set of depth layer is present in this syntax structure. If afps_set_layer_flag is equal to 1, pc_set_depth_layer_updates_minus1 indicates the number of sets depth layers present in the structure. For each set of depth layer i, pc_depth_layer_updates_minus1[i] indicates the number of depth layer in this set of depth layer i. Pc_depth_layer_value[i,j] indicates the depth value of the depth j of the set of depth layer i.

Figure 13:
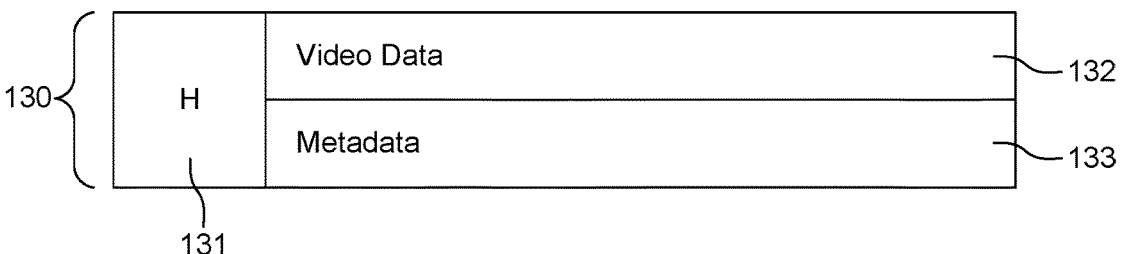
FIG. 13 shows an example of an embodiment of the syntax of a stream when the data are transmitted over a packet-based transmission protocol, according to a non-limiting embodiment of the present principles.

FIG. 13 shows an example of an embodiment of the syntax of a stream when the data are transmitted over a packet-based transmission protocol. FIG. 13 shows an example structure 130 of a volumetric video stream. The structure consists in a container which organizes the stream in independent elements of syntax. The structure may comprise a header part 131 which is a set of data common to every syntax elements of the stream. For example, the header part comprises some of metadata about syntax elements, describing the nature and the role of each of them. The header part may also comprise a part of metadata 1012 of FIG. 10, for instance the coordinates of a central point of view used for projecting points of a 3D scene onto frames 1015 and 1016. The structure comprises a payload comprising an element of syntax 132 and at least one element of syntax 133. Syntax element 132 comprises data representative of the color and depth frames. Images may have been compressed according to a video compression method.

Element of syntax 133 is a part of the payload of the data stream and comprises metadata about how frames of element of syntax 132 are encoded, for instance parameters used for projecting and packing points of a 3D scene onto frames. Such metadata may be associated with each frame of the video or to group of frames (also known as Group of Pictures (GoP) in video compression standards).

According to some embodiments, the metadata 133 comprises an indicator specifying whether data content, i.e. the video data 152, has associated information representative of at least one set of depth layers.

According to another embodiment, metadata 133 further comprises information representative of a set of depth layers specifying a number of depth layers and a depth value for each of the depth layers for a layer-based representation of the data content, i.e. the video data 152.

Figure 14:
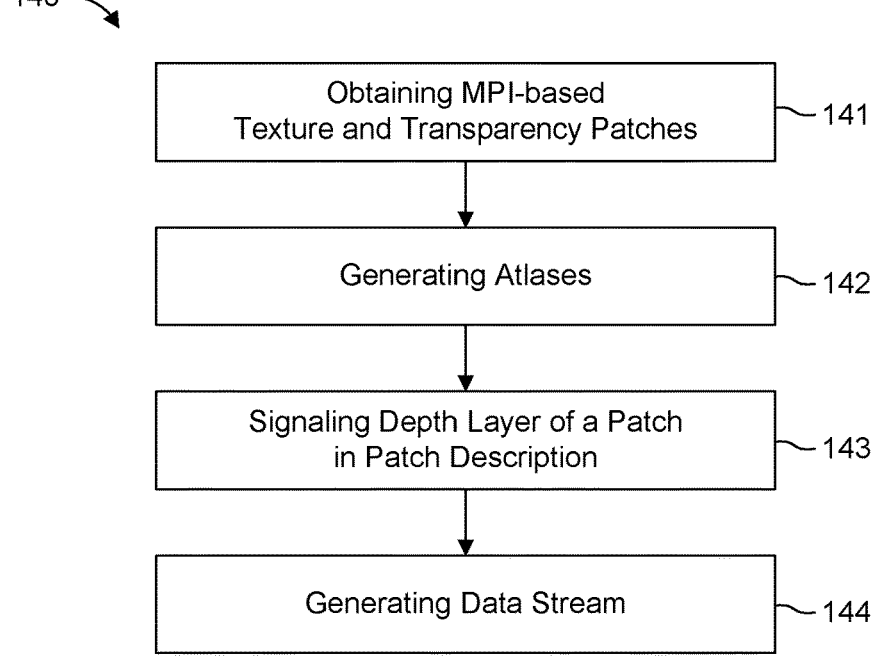
FIG. 14 shows a block diagram of a method for encoding a MPI according to an embodiment of the present principles.

FIG. 14 shows a block diagram of a method 140 for encoding a MPI-based 3D scene according to an embodiment of the present principles. At a step 141, a 3D scene/ volumetric video is obtained, represented as a multi-plane image. Patches pictures are extracted from the different layers of the MPI representation. Patches are either texture patches (i.e; color values comprising a transparency value). At a step 142, these patches are packed in an atlas. In a variant, texture patches do not comprise a transparency value and corresponding transparency patches are obtained. In another embodiment, patches are packed in separate atlases according to their nature (i.e. texture or color, transparency, depth, . . . ). At a step 142, metadata are built to signal the elements of the representation. According to a variant, the number of depth layers of the MPI representation are encoded at a view level in the metadata. At a step 143, the depth layer a patch belongs to is signaled in a syntax structure representative of a description of the patch. At a step 144, generated atlases and generated metadata are encoded in a data stream.

Figure 15:
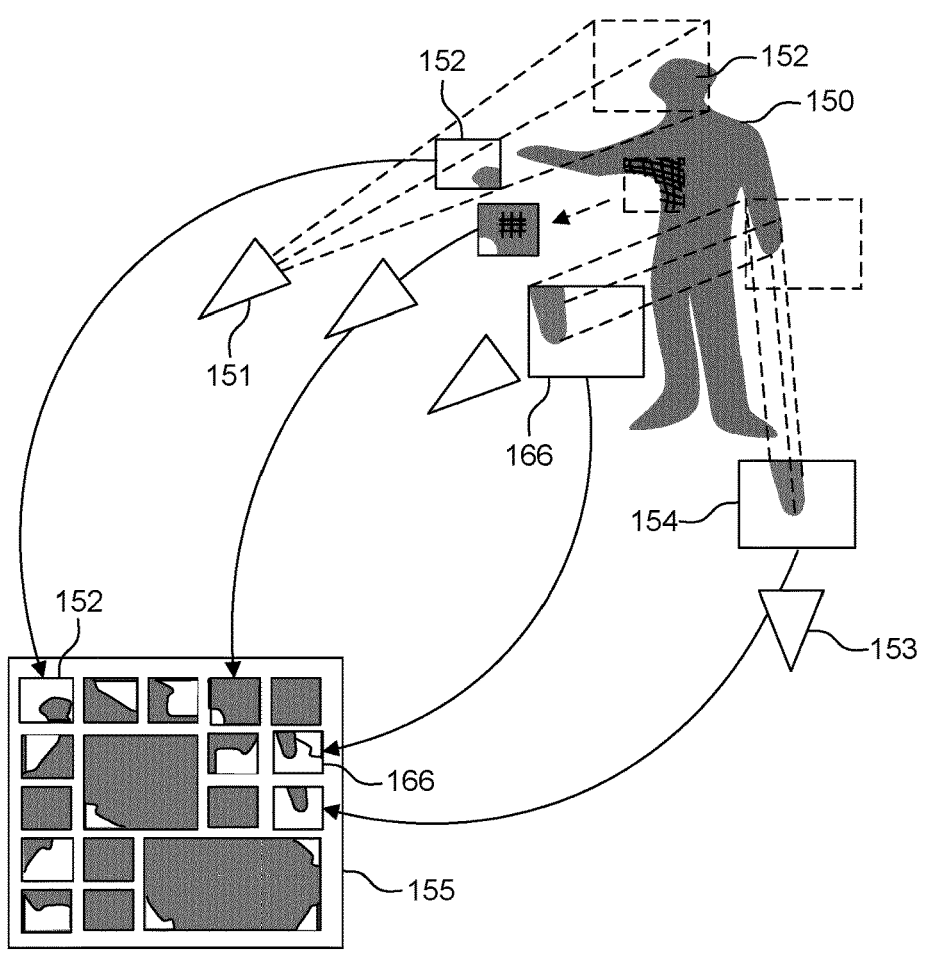
FIG. 15 illustrates a spherical projection from a central point of view, according to a non-limiting embodiment of the present principles.

FIG. 15 illustrates the patch atlas approach with an example of 4 projection centers. 3D scene 150 comprises a character. For instance, center of projection 151 is a perspective camera and camera 153 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 15, projection of the points captured by camera 151 is mapped onto patch 152 according to a perspective mapping and projection of the points captured by camera 153 is mapped onto patch 154 according to an orthographic mapping.

The clustering of the projected pixels yields a multiplicity of 2D patches, which are packed in a rectangular atlas 155. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 154 and 156.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 16:
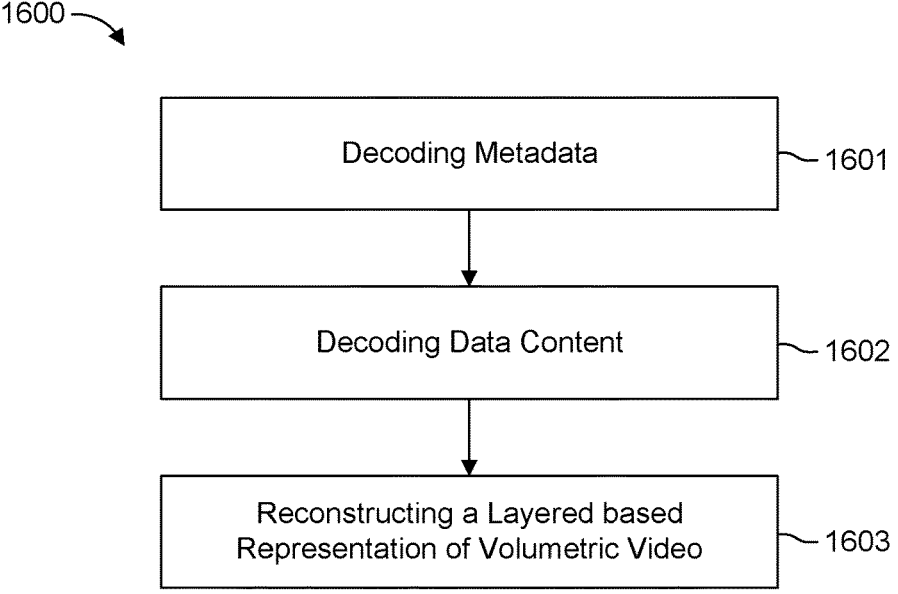
FIG. 16 shows a block diagram of a method 1800 for decoding a volumetric video according to an embodiment of the present principles.

FIG. 16 shows a block diagram of a method 1600 for decoding a volumetric video according to an embodiment of the present principles. At 1601, metadata is decoded from a bitstream, wherein the metadata comprises an indicator specifying whether data content has information representative of at least one set of depth layers, wherein information representative of a set of depth layers specifies a number of depth layers and a depth value for each of the depth layers for a reconstructing layer-based representation of the volumetric video. According to a variant, at 1602, the current data content is decoded from the bitstream. At 1603, the layered based representation of the volumetric video is reconstructed from the decoded data content and the decoded metadata as previously explained with the generating of the CGH. Besides, in a variant, at 1603, any one of the embodiments described above for reconstructing or generating a CGHs can be implemented. According to another embodiment, the 3D scene can be reconstructed using any other rendering methods, such as a method for rendering 3D data on Head Mounted Display.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

c. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example . . . a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method, comprising:
   decoding, from a bitstream, data content representative of a volumetric video; and
   decoding, from the bitstream, an indicator specifying whether the data content has information representative of at least two sets of depth layers, each depth layer in the at least two sets of depth layers associated with a group of pixels at an associated depth, the information representative of the at least two sets of depth layers specifying an indication of a number of sets of depth layers in the at least two sets of depth layers, and for each of the at least two sets of depth layers, a number of depth layers in a respective set of the at least two sets of depth layers and a depth value for each depth layer in the respective set of the at least two sets of depth layers for a layer-based representation of the volumetric video.

2. The method of claim 1, wherein responsive to the indicator specifying that the data content has information representative of the at least two sets of depth layers, the method further comprises:
   decoding, from the bitstream, the information representative of the at least two sets of depth layers;
   selecting a set of depth layers among the at least two sets of depth layers; and
   reconstructing the layer-based representation of the volumetric video, the layer-based representation of the volumetric video comprising a number of depth layers and a depth value for each depth layer corresponding to a number of depth layers and a depth value for each depth layer of the selected set of depth layers.

3. The method of claim 2, wherein the data content representative of a volumetric video is a sequence of multiple plane images, and wherein the sequence of multiple plane images comprises at least one multiple plane image, the at least one multiple plane image comprising a plurality of layers.

4. The method of claim 3, wherein reconstructing the layer-based representation of the volumetric video further comprises:

decoding a subset of patches from an atlas of patches of the sequence of multiple plane images;
   assigning each patch of the decoded subset of patches to a nearest depth layer in the selected set of depth layers; and
   reconstructing each layer of the selected set of depth layers using an assigned patch.

5. The method of claim 3, wherein the indicator specifying whether data content has information representative of the at least two sets of depth layers and the information representative of the at least two sets of depth layers are signaled as a common atlas sequence parameter set.

6. The method of claim 2, wherein the data content representative of a volumetric video is a point cloud.

7. The method of claim 6, wherein reconstructing the layer-based representation of the volumetric video further comprises:
   decoding a subset of samples of the point cloud;
   assigning each sample of the decoded subset of samples to a nearest depth layer in the selected set of depth layers; and
   reconstructing each layer of the selected set of depth layers using an assigned sample.

8. The method of claim 7, wherein the indicator specifying whether data content has information representative of the at least two sets of depth layers and information representative of the at least two sets of depth layers are signaled as general atlas frame parameter set of a raw byte sequence payload syntax.

9. The method of claim 2, further comprising reconstructing at least one computer generated hologram from the reconstructed layer-based representation of the volumetric video.

10. A method, comprising:
    encoding in a bitstream, data content representative of a volumetric video; and
    encoding in the bitstream, an indicator specifying whether the data content has information representative of at least two sets of depth layers, each depth layer in the at least two sets of depth layers associated with a group of pixels at an associated depth, the information representative of the at least two sets of depth layers specifying an indication of a number of sets of depth layers in the at least two sets of depth layers, and for each of the at least two sets of depth layers, a number of depth layers in a respective set of the at least two sets of depth layers and a depth value for each depth layer in the respective set of the at least two sets of depth layers for a layer-based representation of the volumetric video.

11. The method of claim 10, wherein responsive to the indicator specifying that the data content has information representative of the at least two sets of depth layers, the method further comprising encoding the information representative of the at least two sets of depth layers.

12. The method of claim 11, wherein the data content representative of the volumetric video is a sequence of multiple plane images, and wherein the sequence of multiple plane images comprises at least one multiple plane image, the at least one multiple plane image comprising a plurality of layers.

13. The method of claim 12, wherein the indicator specifying whether the data content has information representative of the at least two sets of depth layers and the information representative of the at least two sets of depth layers are encoded in a common atlas sequence parameter set.

14. The method of claim 11, wherein the data content representative of the volumetric video is a point cloud.

15. The method of claim 14, wherein the indicator specifying whether the data content has information representative of the at least two sets of depth layers and information representative of the at least two sets of depth layers are signaled as general atlas frame parameter set of a raw byte sequence payload syntax.

16. An apparatus comprising one or more processors configured for:

decoding, from a bitstream, a data content representative of a volumetric video;

decoding, from the bitstream, an indicator specifying whether the data content has information representative of at least two sets of depth layers, each depth layer in the at least two sets of depth layers associated with a group of pixels at an associated depth, the information representative of the at least two sets of depth layers specifying an indication of a number of sets of depth layers in the at least two sets of depth layers, and for each of the at least two sets of depth layers, a number of depth layers in a respective set of the at least two sets of depth layers and a depth value for each depth layer in the respective set of the at least two sets of depth layers for a layer-based representation of the volumetric video;

responsive to the indicator specifying that the data content has information representative of the at least two sets of depth layers, decoding, from the bitstream, the information representative of the at least two sets of depth layers;

selecting a set of depth layers among the at least two sets of depth layers;

reconstructing the layer-based representation of the volumetric video, the layer-based representation of the volumetric video comprising a number of depth layers and a depth value for each depth layer corresponding to a number of depth layers and a depth value for each depth layer of the selected set of depth layers; and reconstructing at least one computer generated hologram from the reconstructed layer-based representation of the volumetric video.

17. The apparatus of claim 16, wherein selecting the set of depth layers comprises:

determining resources required to reconstruct the layer-based representation of the volumetric video and to reconstruct the at least one computer generated hologram using each of at least one set of depth layers; and selecting a depth layer set with a largest number of depth layers for which the determined resources required to reconstruct the layer-based representation of the volumetric video and to generate the at least one computer generated hologram fits within a resources budget.

18. The apparatus of claim 17, wherein the determined resources comprise at least one of a number of processing cycles, an amount of decoding time, or an amount of memory.

19. The apparatus of claim 18, wherein the resources budget comprises at least one of a number of processing cycles available in the apparatus, an amount of decoding time available in the apparatus, or an amount of memory available in the apparatus.

* * * * *